United States Patent [19]
Breneman et al.

[11] Patent Number: 5,974,135
[45] Date of Patent: Oct. 26, 1999

[54] TELESERVICES COMPUTER SYSTEM, METHOD, AND MANAGER APPLICATION FOR INTEGRATED PRESENTATION OF CONCURRENT INTERACTIONS WITH MULTIPLE TERMINAL EMULATION SESSIONS

[75] Inventors: Reed B. Breneman, Memphis; Bruce C. Rowe, Germantown; James B. Burks, Collierville; John P. Romeo, Germantown, all of Tenn.

[73] Assignee: Harrah's Operating Company, Inc., Memphis, Tenn.

[21] Appl. No.: 08/872,882

[22] Filed: Jun. 11, 1997

[51] Int. Cl.⁶ ..................................................... H04M 3/00
[52] U.S. Cl. ........................ 379/265; 379/93.23; 379/142; 370/352
[58] Field of Search .................................... 379/265, 266, 379/309, 142, 211, 201, 93.23, 93.17; 370/351, 352, 401

[56] References Cited

U.S. PATENT DOCUMENTS

| | | | |
|---|---|---|---|
| 4,599,493 | 7/1986 | Cave | 179/18 FH |
| 4,688,170 | 8/1987 | Waite et al. | 364/200 |
| 5,008,930 | 4/1991 | Gawrys et al. | 379/210 |
| 5,036,484 | 7/1991 | McCoy et al. | 364/900 |
| 5,097,528 | 3/1992 | Gursahaney et al. | 379/67 |
| 5,181,239 | 1/1993 | Jolissaint | 379/96 |
| 5,237,499 | 8/1993 | Garback | 364/407 |
| 5,311,425 | 5/1994 | Inada | 364/407 |
| 5,311,577 | 5/1994 | Madrid et al. | 379/93 |
| 5,379,296 | 1/1995 | Johnson et al. | 370/60 |
| 5,604,896 | 2/1997 | Duxbury et al. | 395/500 |
| 5,619,557 | 4/1997 | Van Berkum | 379/88 |
| 5,621,789 | 4/1997 | McCalmont et al. | 379/265 |
| 5,642,410 | 6/1997 | Walsh et al. | 379/201 |
| 5,655,014 | 8/1997 | Walsh et al. | 379/201 |
| 5,655,015 | 8/1997 | Walsh et al. | 379/201 |
| 5,659,788 | 8/1997 | Someya et al. | 395/500 |
| 5,675,637 | 10/1997 | Szlam et al. | 379/201 |
| 5,754,306 | 5/1998 | Taylor et al. | 379/93.24 |
| 5,793,861 | 8/1998 | Haigh | 379/266 |
| 5,838,682 | 11/1998 | Dekelbaum et al. | 370/401 |

FOREIGN PATENT DOCUMENTS

| | | | |
|---|---|---|---|
| 0 564 779 A2 | 10/1993 | European Pat. Off. | H04M 3/00 |
| 0 753 956 A2 | 7/1995 | European Pat. Off. | H04M 3/50 |
| 2 236 602 | 4/1991 | United Kingdom | G06F 15/16 |

*Primary Examiner*—Scott Wolinsky
*Attorney, Agent, or Firm*—Fenwick & West LLP

[57] ABSTRACT

A teleservices system, workstation configuration, and teleservices manager application provide for integrated concurrent interactions with various host computer systems, an automatic call management system, and Internet/intranet servers. The teleservices system includes an automatic call distributor and call management system, a customer database system, various host systems providing terminal emulation based access, a hypermedia server with hypermedia data on multiple properties, host computer systems, or business locations. The teleservices workstation configuration includes a telephone server application that interfaces to the call management system, a patron server program that interfaces to the customer database system, and a configuration database that stores configuration for configuring each agent's workstation to access various ones of the host computer systems, and identifying various ones of the properties for which the agent provides services. The teleservices workstation manager application controls and interfaces with the telephone server program, the patron server program, and the configuration database. Among other functions, the teleservices workstation manager automatically retrieves customer data from the customer database in response to receiving a telephone number for an incoming telephone call, automatically configures itself to provide terminal emulation sessions for various ones of the host computer systems and properties that the agent is authorized to service, and dynamically selects and retrieves hypermedia data for various ones of such properties. The various data sources are presented through an integrated user interface, and the agent is able to efficiently transfer information between the various systems.

33 Claims, 21 Drawing Sheets

317

Guest Search  [?] [X]

Gold Card
Last Name
First Name
Phone

[Search]  [Cancel]

Password Maintenance  [?] [X]

Host System
[Hotel ▼]

Old Passsword

New Password

Verify New Password

[OK]  [Cancel]

FIG. 14

| Guest Selection | | | | | | | |
|---|---|---|---|---|---|---|---|
| Gold Card | Last Name | First Name | MI | Birthdate | City | State | Type |
| 0019900000514 | CORONADO | CHARLA | | 01/26/66 | DALLAS | TX | H |
| 0019900000513 | CORONADO | CHARLA | C | 01/26/67 | DALLAS | TX | H |
| 0019900000501 | GOLDBERG | JOANNE | L | 07/04/72 | COLLIERVILLE | TN | H |
| 0019900000502 | GOLDBERG | JOANNE | L | 10/02/68 | MEMPHIS | TN | B |
| 0019900000507 | HANSEN | BILL | | 12/31/53 | RENO | NV | H |
| 0019900000508 | MORTON | TIM | H | 07/21/50 | RENO | NV | H |
| 0019900000509 | REES | HORACE | H | 07/21/53 | RENO | NV | H |
| 0019900000506 | REES | ROBERT | | 07/21/53 | MEMPHIS | TN | H |
| 0019900000511 | SMITH XXXXXXX... | DAVID XXXXX... | X | | | | |

319

[ OK ]   [ Search ]   [ Cancel ]

| Main Page |
| Last Page |

Area Information
Casino Services
Daily Agent Briefing
Directions
Facilities
Gold Card Services
Hotel
Main Page
Policies and Procedures
Transportation What's New
Brand Information
Host Computer System Info.

FIG. 10

📞 Call Purpose Summary ? ✕

| Joliet | Las Vegas | North Kansas City |

Ticket — 1201
Transfer
Reservation — 1203
Cancel Reservation

Casino — 1201
Issue Comp
Redeem Comp
Redeem Offer

Hotel — 1201
Reservation
Cancel Reservation

Events(Z) — 1201
Sinatra Sing0a-long
Bagels with Barbara

321

Clear

☐ Information Only

Record    Close

FIG. 12

Note: DisablePhone sets line state to Null from any state.

To Fig. 16B →

Note: DisablePhone sets line state to Null from any state.

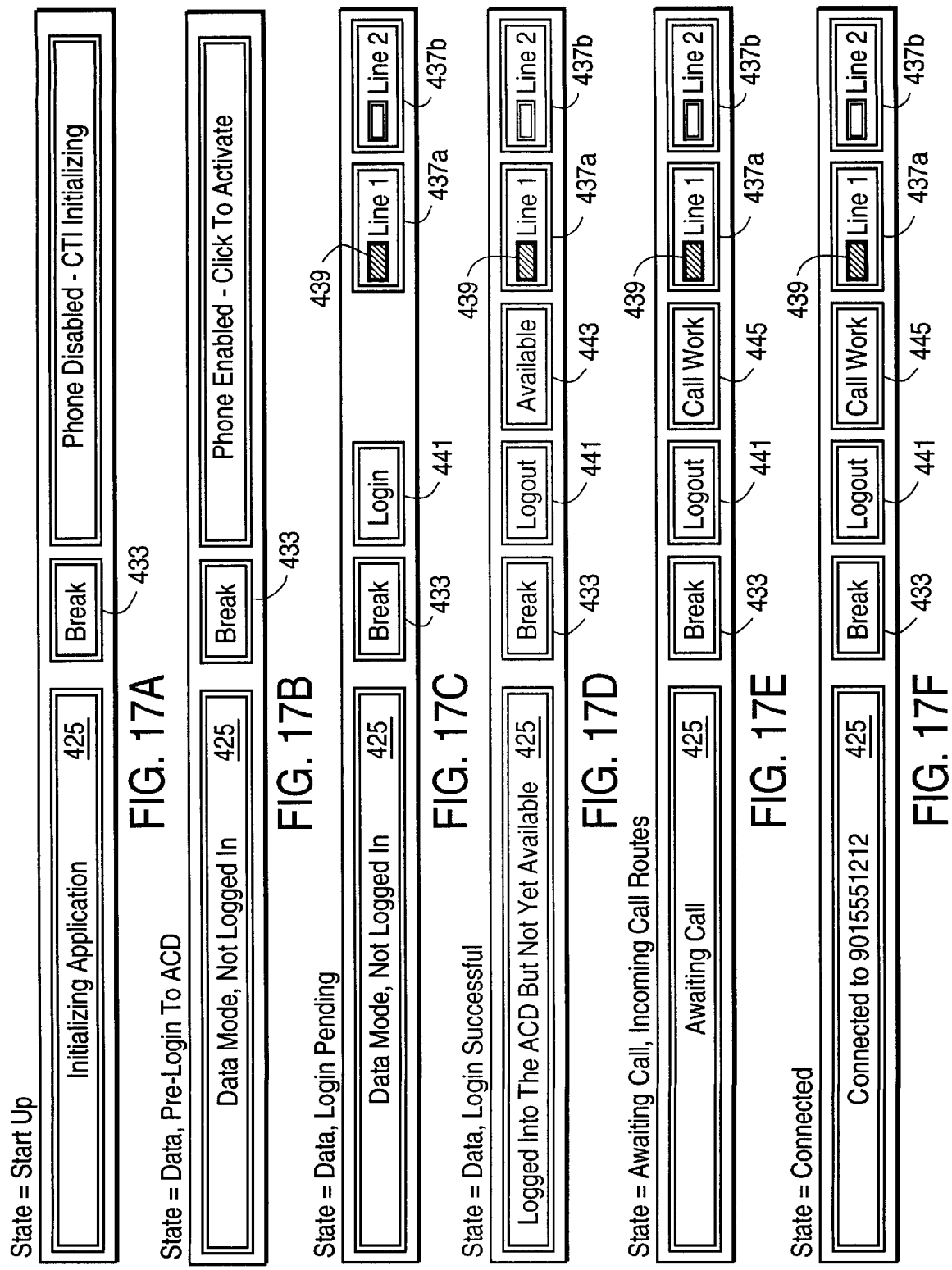

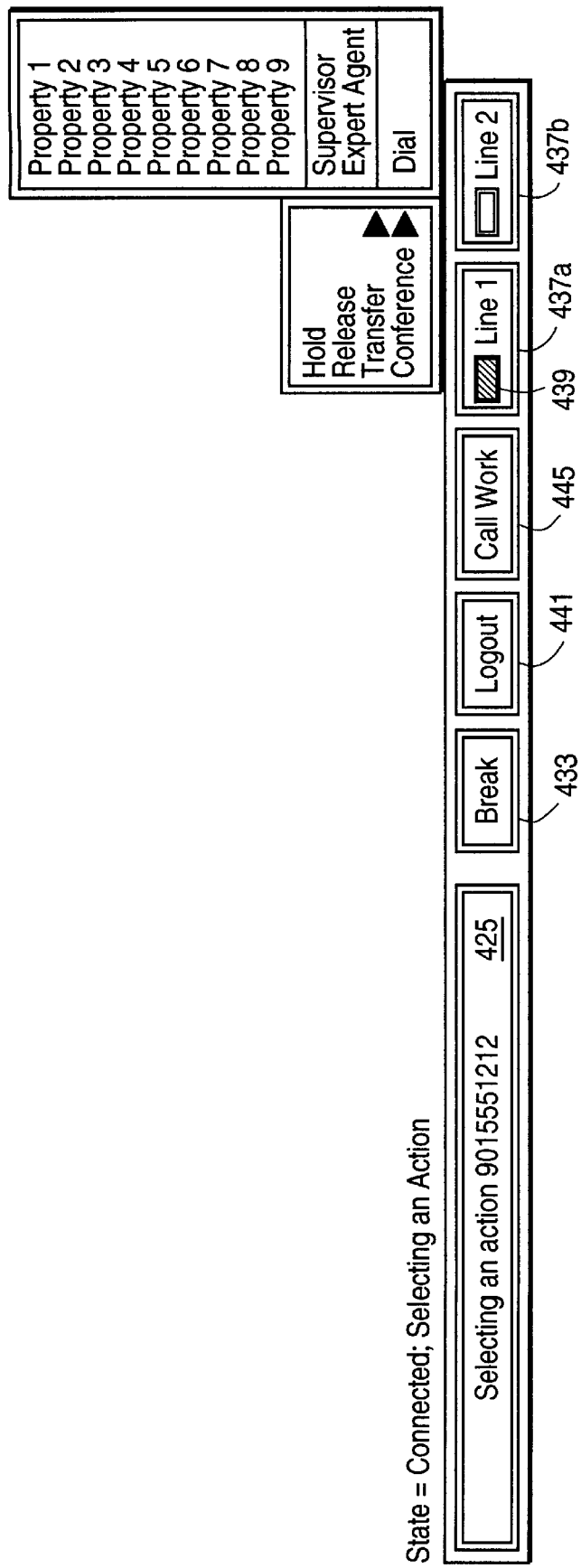
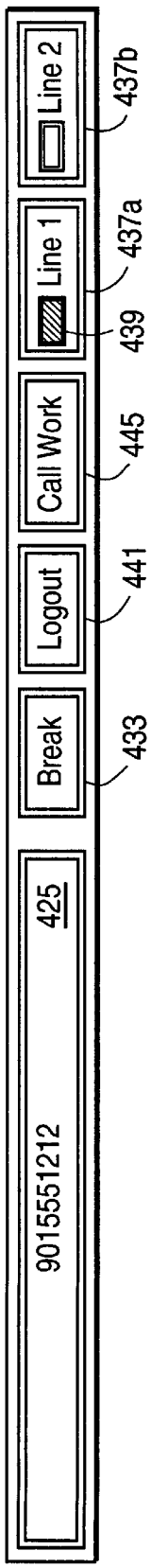
FIG. 17G
FIG. 17H

TELESERVICES COMPUTER SYSTEM, METHOD, AND MANAGER APPLICATION FOR INTEGRATED PRESENTATION OF CONCURRENT INTERACTIONS WITH MULTIPLE TERMINAL EMULATION SESSIONS

BACKGROUND

1. Field of Invention

The present invention relates to systems and methods for managing sessions with both proprietary and non-proprietary systems, and more particularly, for session management with terminal emulation systems, Internet network systems, UNIX-based legacy systems, and telephony control systems.

2. Background of the Invention

Many companies provide telephone-based customer service departments, or teleservices centers, to provide customer service to patrons. Teleservice centers are typically used to process account inquiries for existing customers, to make reservations for various accommodations and services, to accept orders for products or services from new or existing customers, provide technical support, and the like. The typical teleservice center includes an automatic call distributor (ACD) which routes customer calls to customer service agents, a central computer system which stores customer and corporate information, and personal computers, terminals, or workstations at each agent's station. An agent uses the computer to access customer account data, company information, and other data to assist the customer. The agent uses the computer or a telephone set to interact with the ACD to answer, hold, transfer and otherwise handle incoming and outgoing customer telephone calls.

In many teleservice centers, the agents must often access many different, unrelated computer systems and sources of information to assist the customer. For example, in a hotel chain with many hotel properties, a teleservice center agent may need to access customer account data on a legacy computer system, access different computer systems for each hotel property to check for available rooms and rates, and access yet another computer system with a property database to review property descriptions, amenities and the like. In addition, with the recent growth of the Internet and the World Wide Web as publishing and information mechanisms, it may be useful for the agent to access additional information on a company intranet or other Internet sites. Each of these different computer systems and data sources is likely to have completely separate user interfaces, unrelated execution environments, data formats, and communications protocols. Existing legacy systems may be operating on proprietary mainframe computers, and are typically accessed through terminal emulation sessions using proprietary communications protocols. Corporate databases may operate on separate computers running UNIX-based client-server applications. Internet and intranet systems may be based on a third system architecture, such as Intel-based computers running Microsoft Corp.'s Windows95 operating system, using HTTP communication protocols over TCP/IP connections. The ACD itself may have a separate telephony application, used to control it from the agent's computer terminal. Each of the various systems and sources operate independently, requiring separate start up, login, and operational procedures.

FIG. 1 illustrates a screen capture from one conventional teleservices environment. As can be seen, there are multiple, different windows, managed by a number of separate applications. Six of the windows (the TR, LMS, and CMS titled windows) are each for a different terminal emulation session for a different host system. One window (entitled Netscape) is for viewing HTML data on a corporate intranet; the final window (entitled Inbox) is for an email application. To answer a telephone call the agent must physically use the telephone set to connect to the ACD, or must toggle into a separate telephony application on their computer (not shown). Once the telephone call is answered, the agent must toggle into various databases and other computer systems to access information and services for the customer. To access each of the different applications and systems, the agent must toggle repeatedly between the many windows, a slow, time-consuming and sometimes error prone process. Thus, the operating environment of the conventional teleservices workstation can be extremely complex, and difficult to use.

This complex environment has a number of undesirable effects. First, customer service is substantially impaired in this environment. While the agent toggles between different application windows and inputs search requests into different databases, the customer must wait on the telephone line. This process increases the time necessary to service the customer, and decreases the customer's satisfaction.

Second, because the various applications that access the underlying computer systems operate independently, they typically do not share data formats, and there are typically little or no automated mechanisms for transferring data between systems and applications. Thus, the agent may have to repeatedly enter a customer's name, address, account number, birthdate, or the like, from one application into another application in order to obtain reservation, account status, or other information. Again, the customer must wait on the telephone line while the agent performs these operations. The lack of integration of these multiple systems thereby increases the time necessary to service customer calls, reduces the overall number of customer calls that can be processed in a given time period, and reduces customer satisfaction.

Third, the complexity and lack of integration increases the training time and cost for agents. The agent must be trained in the use of each individual system, including how to log into the system, perform all of the operations and functions in each system, and how to handle problems that may arise. Because of the lack of integration, each system and its accessing application is likely to have its own set of operations and procedures.

Accordingly, it is desirable to provide a teleservices system and workstation configuration that enables an integrated presentation of information from multiple, concurrent systems, such as terminal emulation sessions with mainframe or other host type computer systems, hypertext systems based on Internet protocols, and telephony control systems.

SUMMARY OF THE INVENTION

The present invention overcomes the problems of a conventional teleservices workstation by providing a desirable integrated environment that presents multiple, concurrent interactions with various different computer systems.

In one embodiment, the invention operates within a teleservices system comprising various different, unrelated computer systems and databases. An exemplary teleservice system includes an automatic call distributor that receives and routes customer calls to various teleservices workstations, a number of host computer systems that each support a terminal emulation session to access data on such systems, a customer database system that contains customer data, and a hypermedia server, such as an HTTP based, hypertext server, that contains hypermedia data related to various ones of the host computer systems. For example, the hypermedia data may describe location or property data for different physical properties associated with the host computer systems, such as hotels, casinos, amusement parks, or other properties.

In accordance with the present invention, the teleservices workstations are configured to provide a single teleservices application with integrated interfaces to these various systems so that a customer service agent can easily access data, and service customer calls, and transfer data between the systems. In one embodiment, the teleservices workstation includes a telephony control module that interfaces the teleservices application to the ACD. This enables the agent to control the ACD for all telephony functions, without having to interact with both the teleservices application and a separate telephony application or the telephone set. This feature eliminates the time needed for the agent to access a conventional telephony application, and then toggle back to other applications for actually processing the customer's needs. In one usage scenario, the telephony control module automatically receives from the ACD a telephone number of a customer call received at the ACD and routed to the teleservices workstation of the agent.

The teleservices application further includes a database interface to a customer database of customer data. The teleservices application automatically provides the telephone number of the customer call received from the telephony control module to the customer database to retrieve customer data associated with the telephone number. In this manner, the agent is able to see customer data, such as customer name, address, account number, and other information, before answering the customer call and speaking with the customer. This feature further decreases the time needed to access customer data, since the agent does not have to wait to speak to the customer, obtain identifying information from the customer and then manually search the customer database in the first instance to obtain the customer data.

In one embodiment, the teleservices system includes a configuration database containing configuration information for each of the agents using the system. The configuration information specifies for each agent identification information, and host identification information identifying at least one of the host computer systems to be accessed by the agent through a terminal emulation session on their computer. The configuration information may also include property identification information identifying various ones of the properties or locations for which the agent is authorized to provide service.

The teleservices application further includes an interface to a hypermedia server containing the hypermedia data associated with individual ones of a plurality of host computer systems. Through this interface the teleservices application provides the host identification information and property identification information defined for the agent in the configuration database to the server. The server retrieves and provides to the teleservices application the hypermedia data associated with the identified host computer systems or properties. This aspect further customizes the agent's use of teleservices application and environment. By automatically retrieving the hypermedia data for the host computer systems and properties that the agent is working with, the teleservices application further eliminates the time spent manually searching for and retrieving this information. The agent is able to immediately access the hypermedia information without having to manually select the correct information for the properties or host systems that they are working with.

The teleservices application also includes a terminal emulation module that provides a number of agent selectable terminal emulation sessions to the host computer systems. The agent is able to quickly select between the different terminal emulation sessions without leaving the teleservices application environment. The terminal emulation module further receives the host identification information of each host computer system to be accessed by the agent as defined in the configuration database, and automatically establishes a terminal emulation session with each identified host computer system by automatically logging in the user with the agent identification information in the configuration database.

As an additional feature of the invention, the teleservices application provides customer data retrieved from the customer database directly to the host systems through their terminal emulation interfaces. This feature eliminates the time necessary for the agent to manually enter such data once received in response to the incoming telephone call.

As an additional feature of the invention, the teleservices application includes an integrated user interface that displays, through a plurality of selectable display screens, the hypermedia data received from the hypermedia server, the terminal emulation sessions, and the telephone number and associated customer data for the customer call received from the customer database. In this manner, the agent has access to all aspects of the teleservices environment and the multiple systems through a single user interface. This reduces the complexity of the environment to the agent, reduces training time, and the time needed to assist customers.

BRIEF DESCRIPTION OF THE DRAWINGS

FIG. 8 is an example of the search form.

FIG. 9 is an example of the select form.

FIG. 10 is an example list of FactBook topics for a typical property.

FIG. 12 is an example of the call purpose form.

FIG. 14 is an example of the password form.

FIGS. 17a–h illustrate the telephony control panel during various states of the teleservices workstation manager.

DETAILED DESCRIPTION OF THE PREFERRED EMBODIMENTS

System Overview

Figure 1:
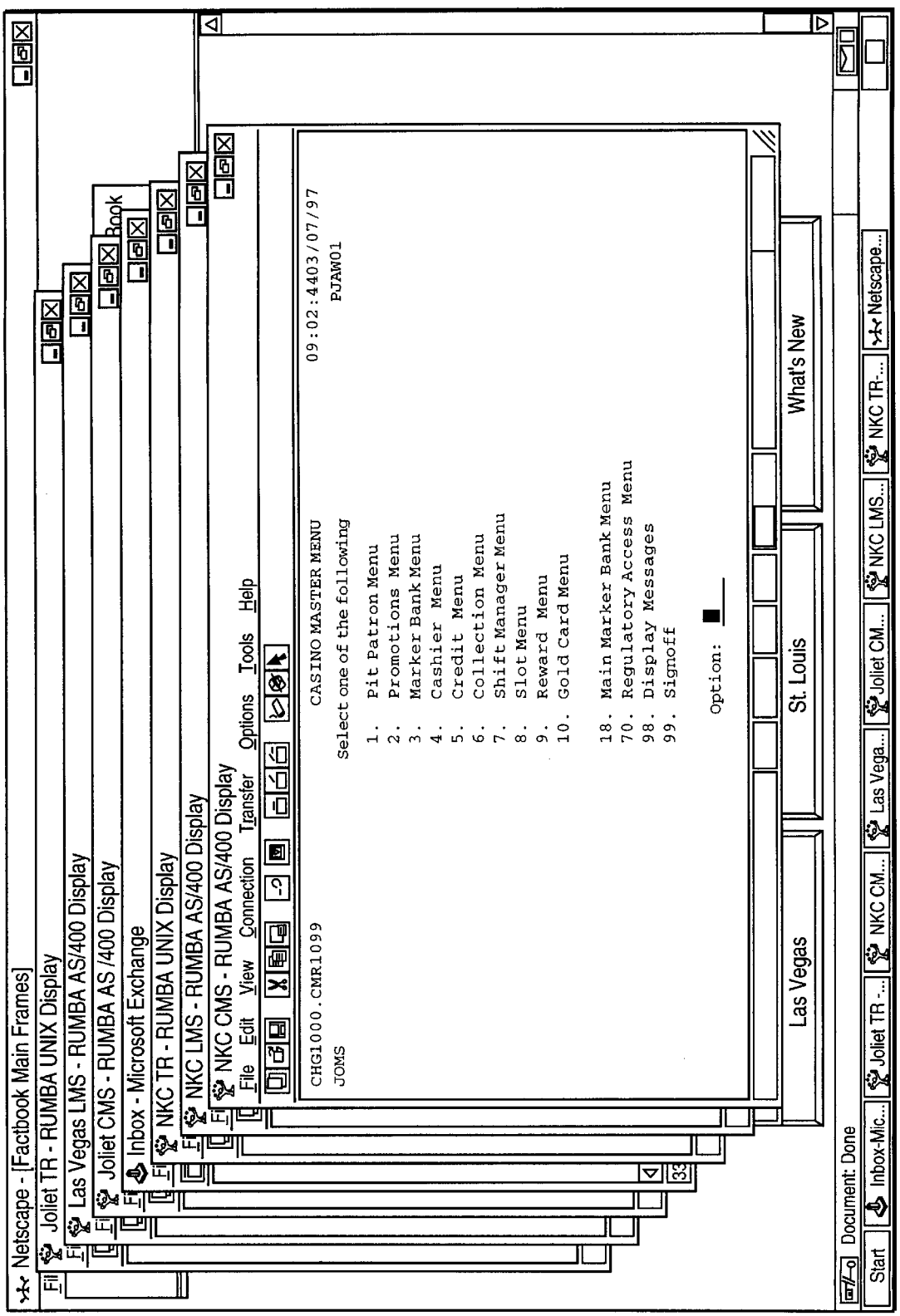
FIG. 1 is an illustration of a conventional teleservices computer screen display.
Figure 2:
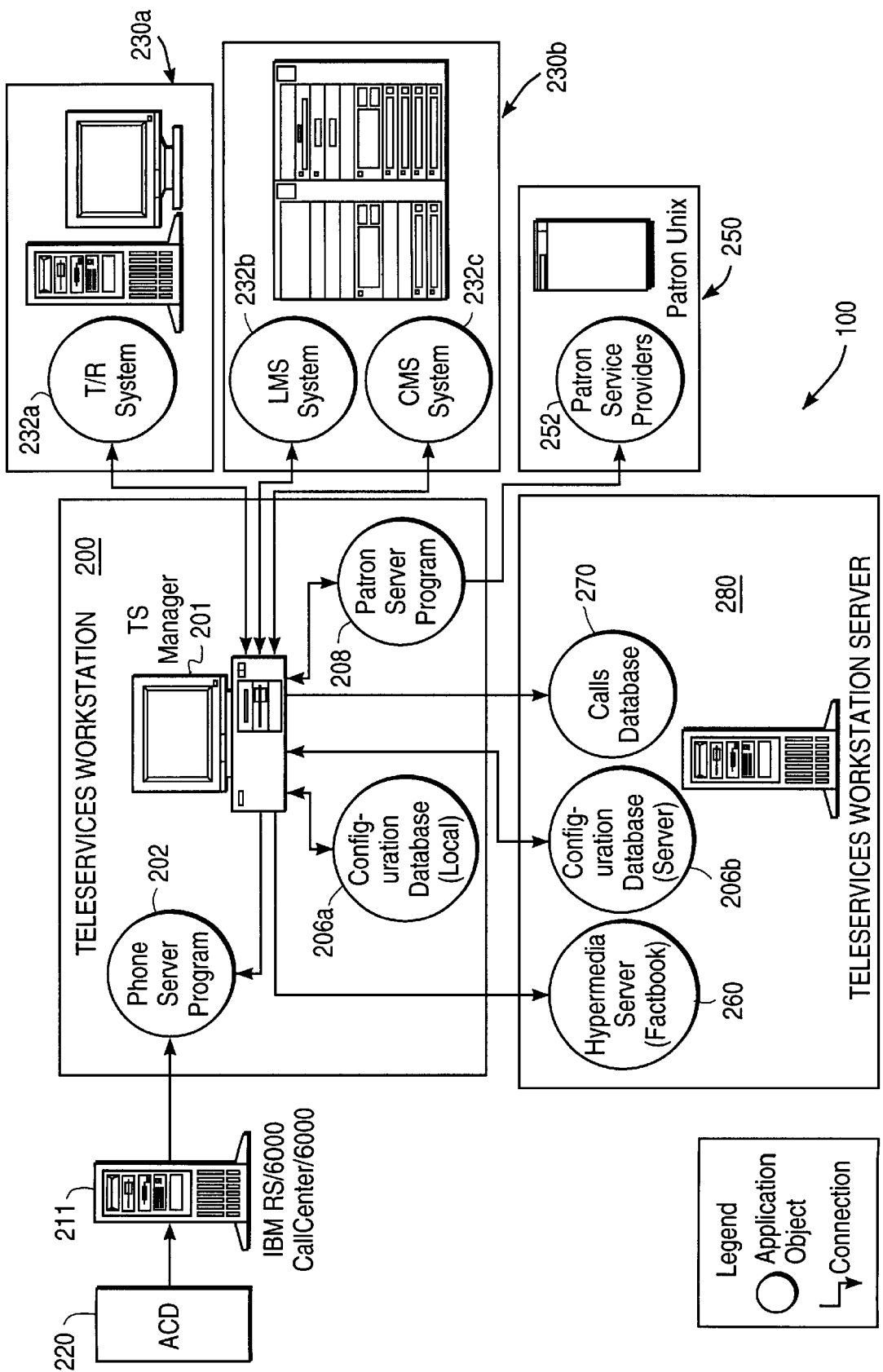
FIG. 2 is a block diagram of a computer system providing a hardware environment for the present invention.

Referring now to FIG. 2 there is shown an illustration of a teleservices system 100 providing an operating environment for the present invention. Teleservices system 100 operates within a call center for supporting customer calls. The system 100 includes an automatic call distributor (ACD) 220 and supporting call management computer system 211, a plurality of teleservices workstations 200, and a teleservices workstation server 280. One teleservices workstation 200 is shown for convenience. Coupled to these components lo over a wide area network or local area network are various host computer systems 230, and a customer database system 250.

Each teleservices workstation 200 is configured to provide the integrated presentation of concurrent interactions with various parts of the overall system. In one embodiment, the teleservices workstation 200 executes various software products that create this integrated presentation. These software products include a teleservices workstation manager 201 that provides an integrated user interface through which the agent controls the other components of the teleservices workstation 200, a telephone server program 202, a local configuration database 206a, and a patron server program 208. The teleservices workstation 200 physically operates on conventional computer hardware, such as an Intel, Pentium-based computer running Microsoft Corp.'s Windows 95 or Windows NT operating system.

ACD and Call Management System

The ACD 220 and call management system 211 are conventional. In the preferred embodiment, the call management system 210 is an IBM RS/6000 computer. Call management software on the call management system 211 is provided by IBM's CallPath. MicroAutomation Inc.'s. Call Center/6000 executes on the call management system 211 and provides an interface between the call management software and the telephone server program 202. The functionality of the ACD 220 may be embodied on the same physical machine as a Public Branch Exchange (PBX).

The telephone server program 202 operates in conjunction with the call management system 211 to provide the teleservices workstation manager 201 with control of incoming calls to be distributed to the available agents on a balanced distribution basis. The telephone server program 202 provides functionality for connecting, disconnecting, transferring, conferencing, and holding customer calls along with dialing new calls, and logging on and off of the ACD 220. In particular, the telephone server program 202 automatically receives the telephone number of an incoming call from the ACD 220 and provides it to the teleservices workstation manager 201.

Hypermedia Server

The hypermedia server 260 provides hypermedia data to the agent through a hypermedia browser module of the teleservices workstation manager 201. The hypermedia server 260 is a conventional hypermedia server, such as an HTTP server, serving HTML, Java, .GIF, .PDF, or other forms of hypermedia data. The server 260 may have access to intranet sites and to external Internet sites. In an embodiment described herein, the hypermedia data of the server 260 is called the "FactBook," and contains data describing various properties, locations, and facilities related to the business operations of the organization using the teleservices center. Items of data in the FactBook are accessed by uniform resource locators (URLs) using the Hypertext transport protocol (HTTP).

Configuration Databases

The teleservices workstation 200 includes a local configuration database 206a that contains configuration information required to operate the system for each agent. This configuration information includes for each agent, identification information such data as user ID's, authentication information (passwords, certificates and the like), and other identifying data. The configuration data may also include host identification data for various ones of the host computer systems 230 that the agent is to access through a terminal emulation session on the teleservices workstation manager 201. The configuration data may also include definitions of the screen locations of data fields on the screen displays from the host computer systems 230 to allow for extracting data from, and writing data to, various ones of the host computer systems 230 via the terminal emulation sessions.

In one embodiment, the teleservices system 100 is used as a ticketing and/or reservation system for businesses such as for hotels, casinos, airlines, or the like, where there are multiple properties or locations for which the agent secures reservations or other transactions. In such systems, each agent may be assigned to service transactions for specific properties or locations. For example, in a teleservice center for a hotel chain, specific agents may be assigned to make reservations for specific hotel properties. In these types of embodiments, the configuration information includes property identification information of the properties assigned to each agent. In this embodiment, the FactBook collection on the hypermedia server 260 then also includes information on each of the various properties.

In the preferred embodiment, there is also provided a configuration database 206b on the teleservices workstation server 280, containing the same information as the local configuration database 206a. The local configuration database 206a is then a replicated copy of the server database 206b. This allows for global maintenance of this configuration database 206b on the server but execution from the local configuration database 206a at runtime for performance and reliability. The local database 206a may be replicated from the server 280 to the teleservices workstation 200 at agent sign-on, when the agent goes on break or at the request of the operations staff of the teleservice center.

The local configuration database 206a is preferably implemented as a Microsoft Access database, with the configuration database 206b on the teleservices workstation server 280 being a Microsoft SQL Server 6.0 database.

Customer Database System and Patron Server Program

The customer database system 250 includes a database of customer data, including such data as customer name, account number, prior transactions, account balances, and other customer specific information. In one embodiment, the customer database system 250 is implemented as a client/server application under the UNIX operating system. Patron service providers 252 provide a multithreaded service interface to the customer database system 250. In another embodiment, the customer database system 250 may be implemented as part of a host computer system 230.

The patron server program 208 provides the teleservices workstation manager 201 an interface to the customer database system 250. The patron server program 208 receives the telephone number of an incoming call from 10 the teleservices workstation manager 201 and queries the customer database system 250 with it to receive customer data associated with the telephone number. This customer data is provided back to the teleservices workstation manager 201, which displays it to the agent.

In one embodiment, the patron service providers 252 interface with the patron server program 208 through AT&T's TOP-END transaction management programs. In one embodiment, the customer database system 250 is in accordance with the system disclosed in Ser. No. 08/680, 208, filed on Jul. 11, 1996, and entitled "Patron Database Architecture."

Host Computer Systems

The host computer systems 230 are distinguished from the customer database system 250 by their access methods and protocols. The host computer systems 230 are accessed through terminal emulation sessions from the teleservices workstation manager 201, using closed specification protocols. In the preferred embodiment, the host computer systems 230 are supported on IBM AS/400 and RS/6000 computers. A host computer system 230 may support many different applications 232, each with its own terminal emulation protocols.

In one embodiment of the invention, the teleservices system 100 supports operations of a hotel and casino chain having multiple properties. In this embodiment, for each property, the host computer systems 230 provide various transaction support applications 232 for these business operations. Exemplary transaction support applications 232 are illustrated in FIG. 2 as follows. LMS 232b is a lodging management application, which comprises software necessary for managing hotel operations including reservations, room service, and other activities associated with hotel operations. CMS 232c is a casino management application that tracks individual customer gaming activities at the various hotels and casinos. Customer gaming data is collected through automated bet, slot, and pit tracking systems known in the art. In one embodiment, bet and pit tracking is in accordance with the system disclosed in U.S. Pat. No. 5,613,912, "Bet Tracking System for Gaming Tables." T/R application 232a is a ticketing and reservation application for securing reservations at the various hotel properties. In one embodiment, for each property there may be one or more terminal emulation sessions with each of the various host computer systems 230. In a preferred embodiment, LMS 232b and CMS 232c are implemented as Report Program Generator based applications for IBM AS/400, and T/R application 232a is provided by Pacolian Systems Inc.'s Ticketing and Reservation module.

The various host computer systems 230 may be physically distributed onto different computer systems and locations, and communicate over a wide area network. In a preferred embodiment, communication between the host computer systems, and other components of the teleservice system is in accordance with the system disclosed in Ser. No. 08/653, 436, filed on May 24, 1996 and entitled "National Customer Recognition System and Method", now U.S. Pat. No. 5,761, 647.

Teleservices Workstation Server

The teleservices workstation server 280 provides the execution environment for the configuration database 206b and a customer calls database 270. Preferably, there is one teleservices workstation server 280 per call center, with a hypermedia server 260 and its data existing on one of these servers located on the wide area network.

Figure 13:
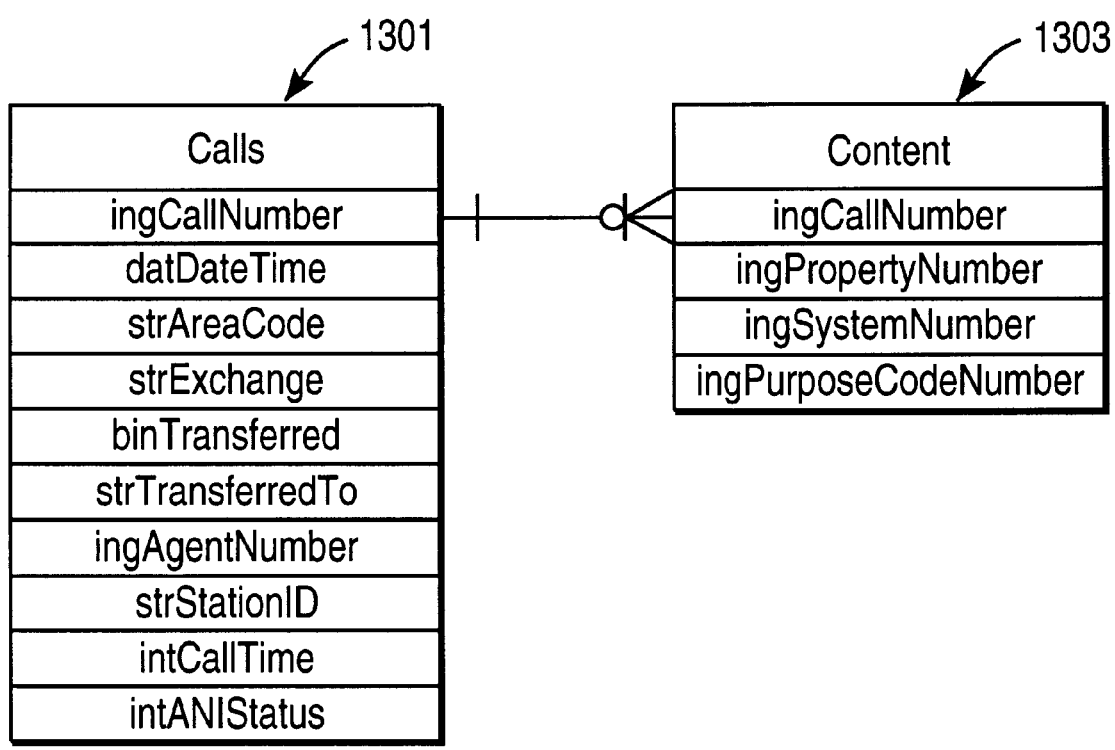
FIG. 13 is an entity-relationship diagram for the calls purpose database.

The customer calls purpose database 270 contains call specific information regarding the history of customer calls serviced by the teleservices center. The customer calls database 270 is primarily used for analysis and management of call distribution, quality control of call handling by agents, and other administrative functions. FIG. 13 is an entity-relationship diagram for one embodiment of the calls purpose database 270.

Teleservices Workstation Manager

Figure 3:
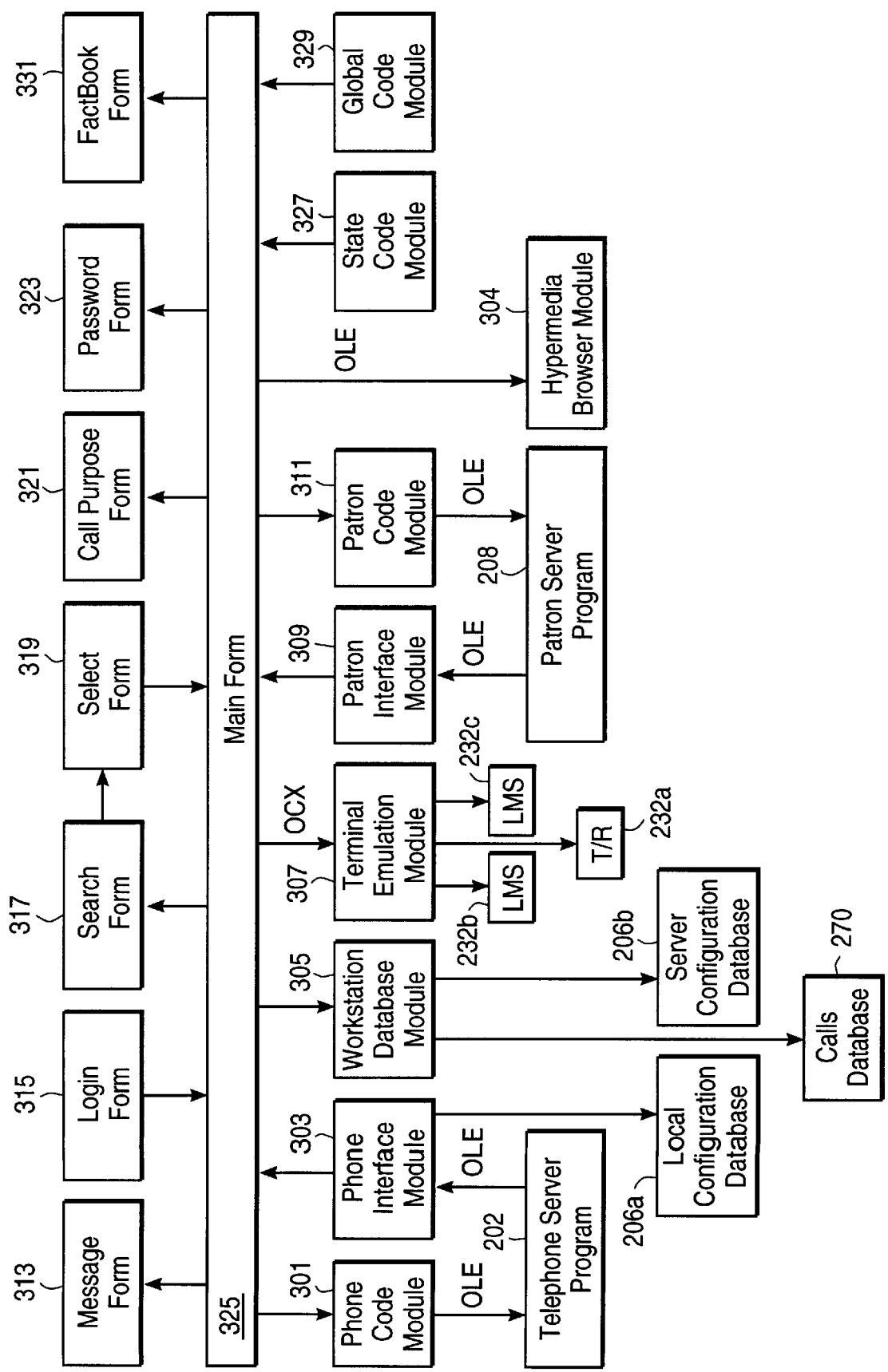
FIG. 3 is a block diagram of the software architecture of the teleservices workstation manager.

Referring to FIG. 3, there is shown a block diagram of the software modules of the teleservices workstation manager 201 on the teleservice workstation 200. The teleservices workstation manager 201 comprises various code modules providing procedural functionality, state control, data definition, and form modules that define various components of the user interface and user interface interactions. The code modules of the teleservices workstation manager 201 are as follows.

Telephone code module 301—This module provides the functions for accessing the telephone server program 202, and for displaying, controlling, and responding to telephone events within the teleservices workstation manager 201. The telephone code module 301 provides for all telephony controls, such as connecting, disconnecting, transferring, holding, dialing, and so forth of customer calls.

Phone interface module 303—This module provides an interface to the telephone server program 202 of functions required by the telephone server program 202 to communicate data to and from the teleservices workstation manager 201. Among other functions, the phone interface module 303 is used by telephone server program 202 to return the telephone number of an incoming call.

Workstation database module 305—This module provides procedures and functions for interface to and manipulation of the local configuration database 206a, the server configuration database 206b, and the calls database 270, including the validation of one configuration database against the other to maintain the currency of the local configuration database 206a, the replication of changed data, and the selection of which copy to use for current operation. By the use of this module, the rest of the teleservices workstation manager 201 has no dependence on which database is actually being used at any point in time.

Terminal emulation module 307—This module provides for multiple terminal emulation sessions with any of the host computer systems 230 and their supported applications. The preferred terminal emulation module 307 is Wall Data Inc.'s Rumba Office 95/NT.

Patron code module 309—This module provides the functions required to interface the teleservices workstation manager 201 to the patron server program 208, which in turn provides all procedures and functions necessary to interface the teleservices workstation manager 201 to the customer database system 250. Among other functions, the patron code module 309 queries the customer database system 250 with the telephone number of an incoming call to obtain the customer data for the telephone number.

Patron interface module 311—This class module provides the callback function required by the patron server program 208 to signal to the teleservices workstation manager 201 that data has been returned from the customer database system 250. The customer database system 250 uses the patron interface module 311 to return the customer data associated with an input telephone number.

Global code module 329—This module contains common data structure definitions, general procedures, and functions used by more than one other form or code module.

State code module 327—This contains procedures for effecting state changes in the teleservices workstation manager 201, particularly with respect to telephony control.

Hypermedia browser module 304—This module provides an interface to the hypermedia server 260 to retrieve hypermedia data therefrom and to display the hypermedia data in the FactBook form 331. This module contains the functionality needed to browse hypermedia data, including the ability to render HTML, SGML, PDF or other document description languages, execute Java or other applets, and communicate with the hypermedia server 260. In the preferred embodiment, the hypermedia module 304 is provided by a browser object from Microsoft Corp.'s Internet Explorer, which is registered with the teleservices workstation manager 201 as an OLE control.

The form modules of the teleservices workstation manager 201 define the user interface of the application, and the organization and presentation of data from the various computer systems. The forms include both user interface controls and the underlying code to invoke functionality for such controls. The form modules are as follows:

Main Form 325—This form is the primary interface for the teleservices workstation manager 201. The main form 325 provides the agent with an integrated user interface through which all functionality of the teleservices workstation manager 201 may be accessed, and through which data retrieved from the customer database 250, various host computer systems 230, and telephony control information for the telephone server program 202 and call management system 211 is displayed. The main form 325 provides a telephony control panel for controlling the call management system 211. It also provides the command buttons through which other functions of the teleservices workstation manager 201 are accessed. Finally, the main form 325 manages the user selectable terminal emulation session windows through the terminal emulation module 307.

Login Form 315—This form module is used to accept and validate the agent login and tailor the functions offered according to the agent's access level. Login form 315 displays fields for inputting an agent or user ID, and a password. Code in this form module manages all required logins, such as network, mail and database, to be executed, using the input identification information.

Search Form 317—This form is used by the agent to search for customer data in the customer database system 250 for customer data matching the criteria input on the form. One particular use of the search form 317 is to search for customer data if an incoming telephone number failed to properly retrieve customer data for the caller. This form also allows the agent to enter specific data supplied by the caller to be used as criteria for a subsequent search.

Select Form 319—This form module is used to display a list of possible customers matching specific criteria in a search request, allowing the agent to select one entry from the list. The customer data for a selected customer is displayed on the main form 325.

Call Purpose Form 321—This form module provides the agent a method for specifying the properties involved in processing the current call and the specific actions taken by the agent on behalf of the guest during the call processing. Data from the call purpose form 321 is then provided to the call purpose database 270.

Password Form 323—This form provides the agent with a method for updating the agent's host session passwords in the configuration database 206 following on-line host password changes.

Message Form 313—This form module provides the interface to the system 100 for determining whether the logged in agent has any pending electronic mail messages, displays a list of all pending mail messages for the logged in agent and displays the text of the message selected by the agent from the list. This form also provides a delete function for a selected message, and functions for creating and send mail messages.

FactBook Form module 331—This module provides a full-screen browser interface in which to display the FactBook data from the hypermedia server 260. The module uses the hypermedia browser module 304 to access and display hypermedia data.

The teleservices workstation manager 201 also includes a form module for dialing outgoing telephone numbers.

Figure 4:
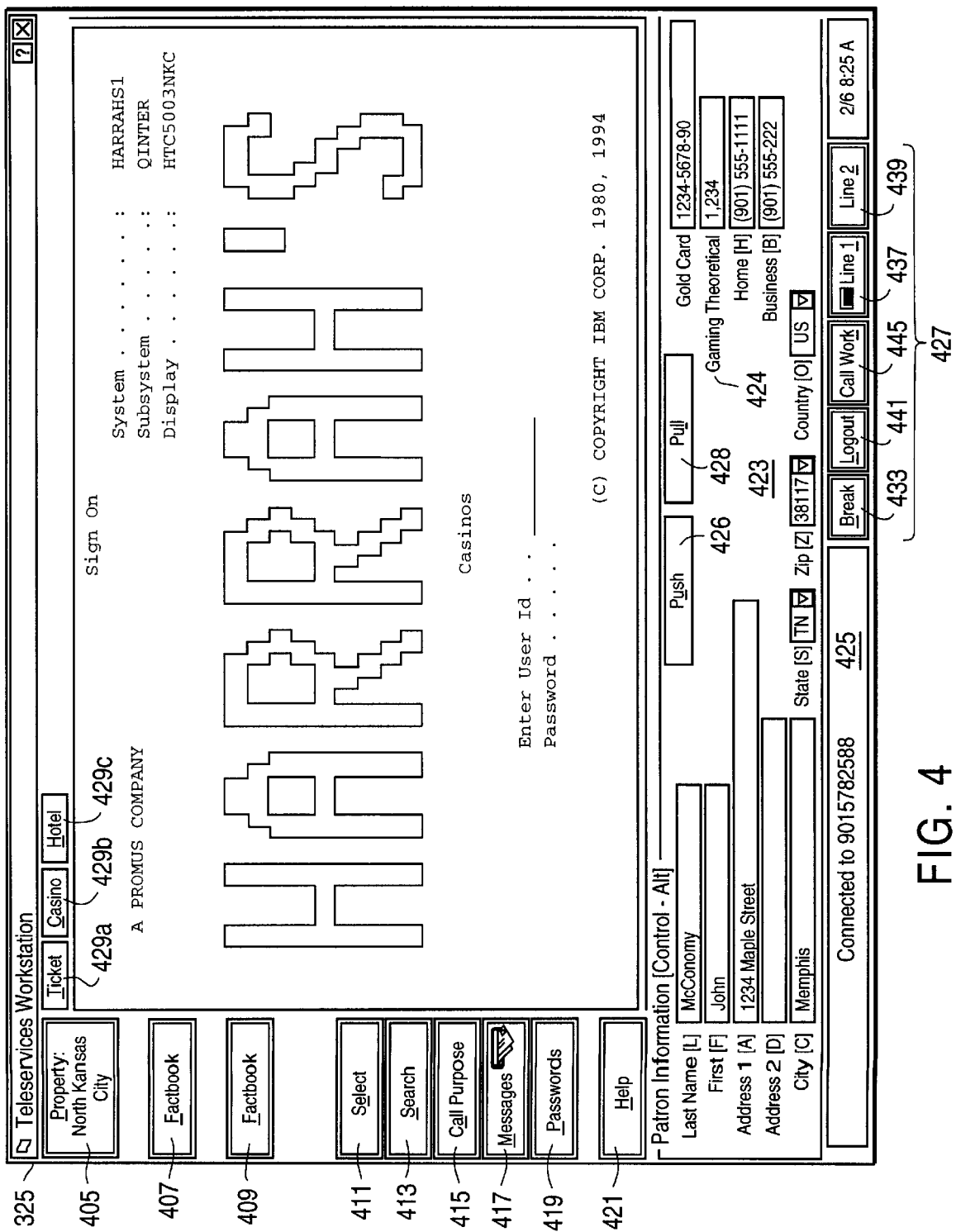
FIG. 4 is an illustration of the main form, providing the primary user interface of the teleservices workstation manager.

Referring to FIG. 4, there is shown an exemplary embodiment of the primary user interface of the teleservices workstation manager 201, as provided by the main form 325. The main form 325 comprises four functional areas, a display screen 403, a control area with various command buttons, a customer data display area 423, and a telephony control panel 427.

The display screen 403 displays terminal emulation interfaces as managed by the terminal emulation module 307. As the terminal emulation module 307 is capable of supporting multiple, concurrent terminal emulation sessions with the plurality of host computer systems 230, the main form 325 provides for agent selectable tabs 429 to control which terminal emulation session is displayed in display area 403. Each tab 429 is associated with one terminal emulation session for one of the host computer systems 230 or transaction support application 232; i.e., tab 429a is for selecting a terminal emulation session with ticketing/reservation host computer system 230, tab 429b is for lodging management host computer system 230, and tab 429c is for casino management host computer system 230.

The customer data display area 423 displays customer data retrieved from the customer database system 250. Customer data display area includes fields for the customer's first and last names, address, city, state, zip code, country, various telephone numbers, and account number (here "Gold Card"). In addition, in an embodiment of the system used for casinos, the customer data display area includes a field 424 for displaying the customer's gaming theoretical win, which is a statistical estimate of the casino's average winnings from the customer, over a defined period of time, such as a day, a customer's trip, or the like. Integration of the customer data display areas 423 into the main form 325 enables the agent to immediately see relevant customer data for the customer on the call, without having to switch to another application providing a separate interface to the customer database system 250. In particular, display of the theoretical win information enables the agent to provide "comps", or complimentary items, such as free rooms, event tickets, services, and the like directly to the customer at the time of the customer call.

The customer data display area 423 further includes push 426 and pull 428 buttons. The push button 426 is used to transfer customer data displayed in the customer data display area 423 into the currently displayed terminal emulation session in the display area 423. The pull button 428 is used to populate the customer data display area 423 with data extracted from another instance of a terminal emulation session 403, thereby enabling the push button 426 to be used to populate a different terminal emulation session 403, or a customer data display area 423 for transfer to the customer database system 250. This allows the agent to transfer data between otherwise uncoupled terminal emulation sessions.

The status panel 425 displays status information indicative of the state and state changes of the teleservices workstation manager 201, such as the state of the telephone line, login status, and the like.

The current property button 405 identifies a current property for which the agent has current terminal emulation sessions. The property button 405 is associated with a properties menu which lists all properties which the agent is authorized to access or service. The current property button 405 also controls which hypermedia data is available immediately from the FactBook on the hypermedia server 260.

The telephony control panel 427 provides dynamically updated status and command buttons for controlling the ACD 220 through the call management system 211. All telephony control is provided through the telephony control panel 427, which provides a very small footprint on the computer screen. The telephony control panel 427 includes Break 433, Logout 411, Call Work 451 buttons, and two line-extension buttons Line 1 (437a) and Line 2 (437b). Integration of the telephony control panel 427 directly into the teleservices workstation manager 201 enables the agent to interact with the call management system 211 from within the teleservices workstation manager 201, without having to switch to a separate telephony application or reach for the telephone set, as in conventional systems.

Figure 5:
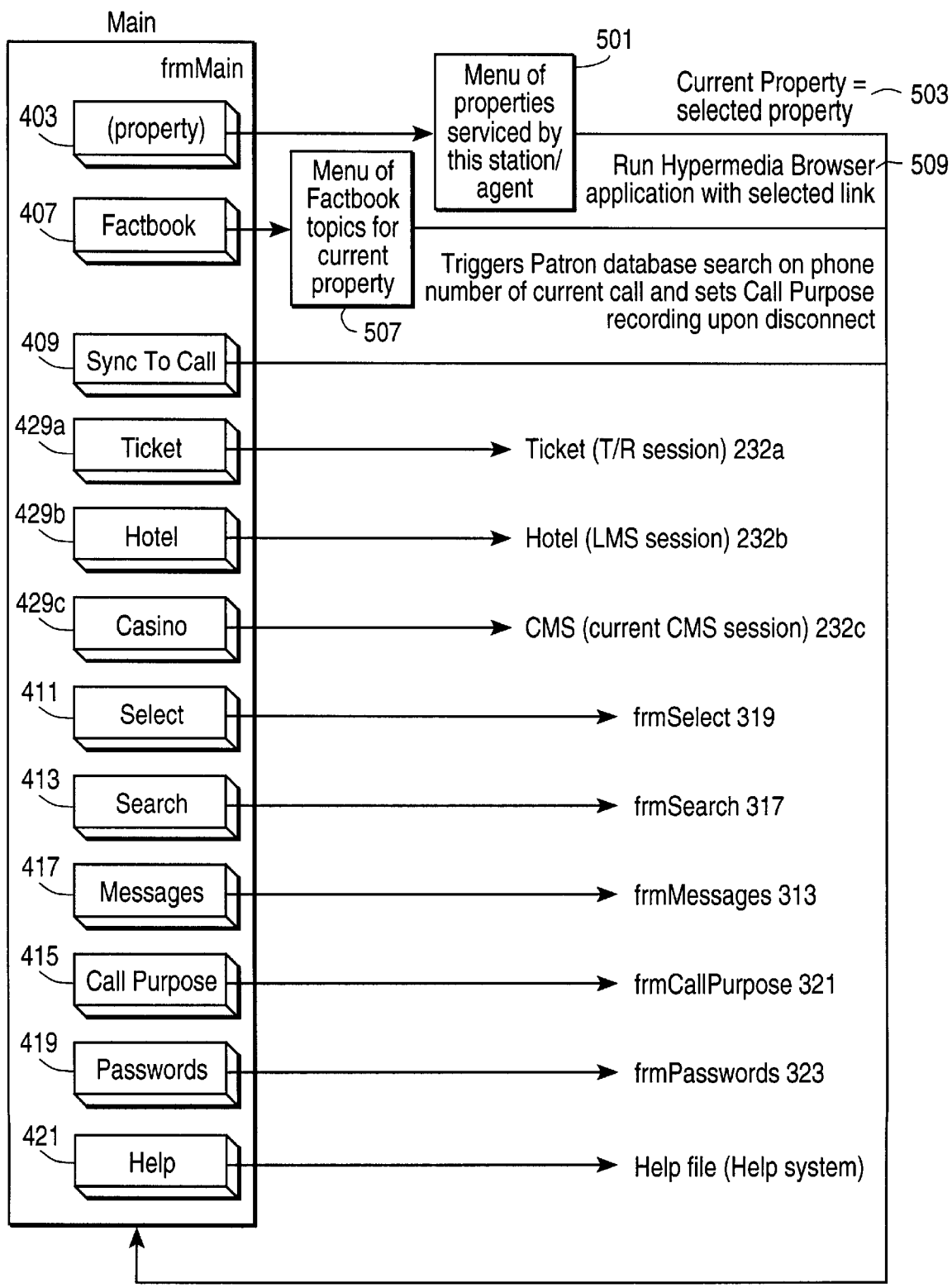
FIG. 5 is a form dependency diagram for the main form.

FIG. 5 is a form dependency diagram of the form transition logic between the main form 325 and the other forms via the command button area. In FIG. 5, the text at the left side of a diagram indicates the form module from which the transition is occurring. Flow is essentially left to right. The main form 325 is depicted as a rectangle containing command buttons, which are raised 3D rectangles. At the right edge of the diagram, text indicates the next form resulting from selection of the connected command button. The usual method for leaving one form to progress to the next is button actuation, and the arrowed line drawn from a button to a form indicates that the actuation of that button causes the application to advance to the form indicated by the form symbol on the other end of the arrowed line. Button actuation may cause flowchart logic to be invoked. The relationships between the main form 325 and the other forms is described below. The remaining forms are discussed in more detail below with respect to their operational scenarios for which they are used.

In one embodiment, the teleservices workstation manager 201 is a Microsoft Visual Basic 4.0 application. The teleservices workstation manager 201 provides the agent with all of the functionality needed to control the telephone server program 202, the hypermedia browser module 304, the local configuration database 206, and the patron server program 208. In one embodiment, the teleservices workstation manager 201 controls the local configuration database 206 using direct code manipulation of a Microsoft Access database object in Microsoft Jet 3.0 format. The teleservices workstation manager 201 controls the customer calls database 270 located on the teleservices workstation server 280 using RDO/ODBC interface to SQL Server 6.0. The teleservices workstation manager 201 controls the telephone server program 202, and the patron server program 208 using OLE 2.0 Automation. Thus, the agent has no need to directly interact with any of these components of the teleservices workstation 200, but can control their functionality through the teleservices workstation manager 201.

Operational Scenarios

Application Startup and Login

Figure 6:
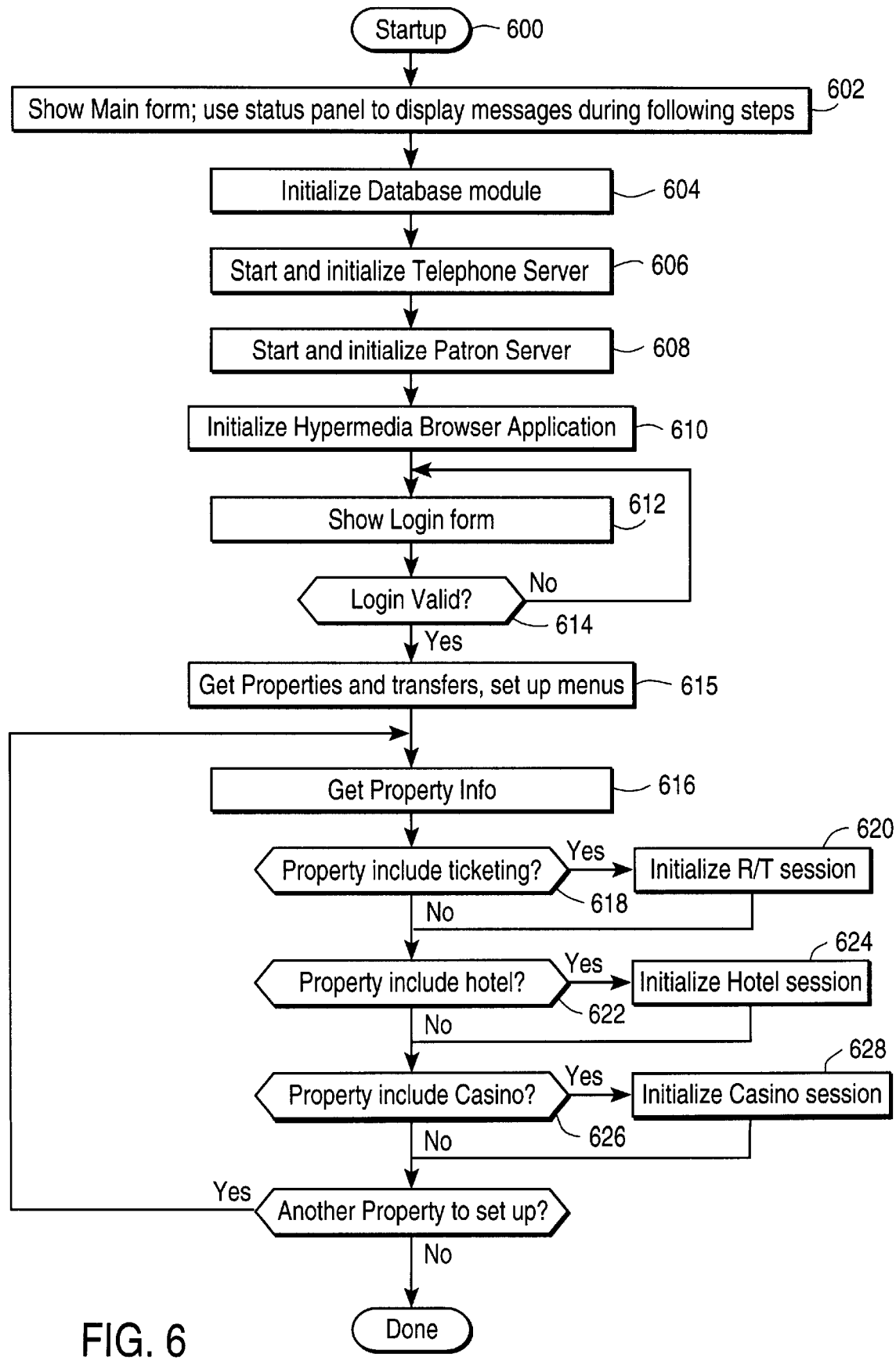
FIG. 6 is a flowchart of the application start up process.

Referring now to FIG. 6, there is shown a flowchart of the startup procedure for the teleservices workstation manager 201. The teleservices workstation manager 201 displays 602 the main form 325 to the agent. The status panel 425 is used to display messages during the startup process.

The teleservices workstation manager 201 initializes the workstation database module 305, and starts up and initializes 606, 608, 610 the telephone server program 202, the patron server program 208, and the browser module 304 applications, registering its interfaces with these applications as necessary.

Figure 7A:
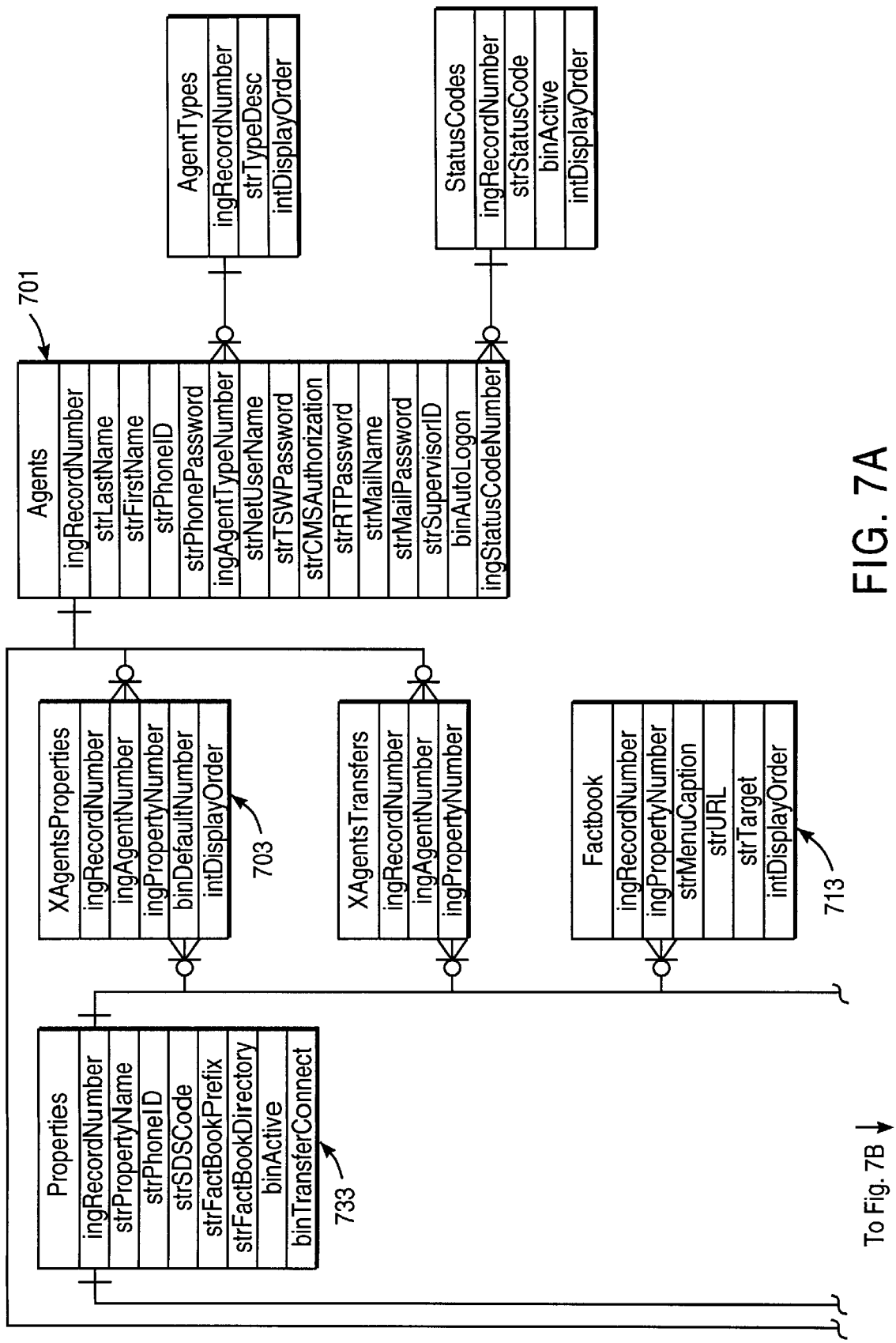
FIG. 7 is an entity-relationship diagram of the configuration database.
Figure 7B:
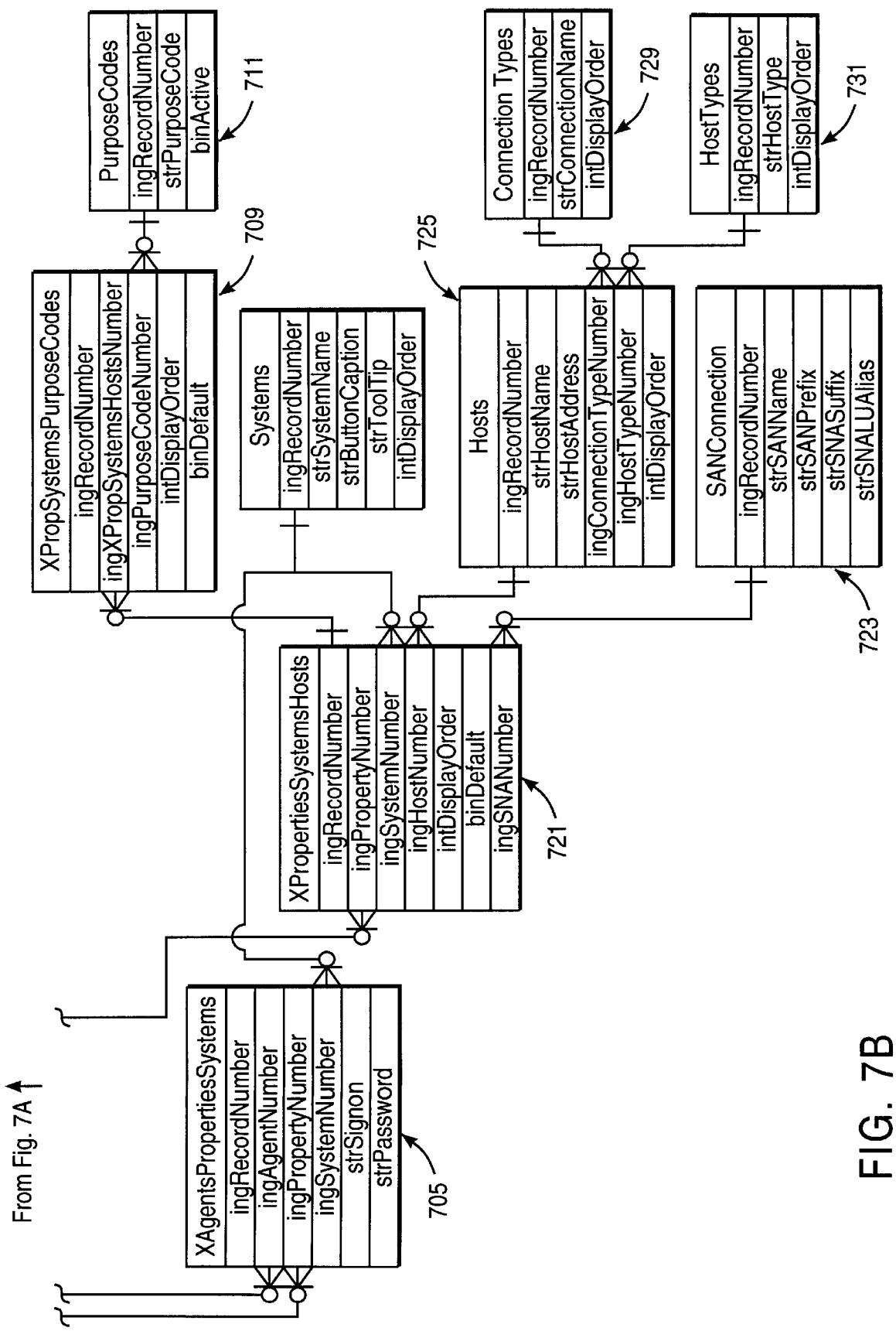
Figure 7C:
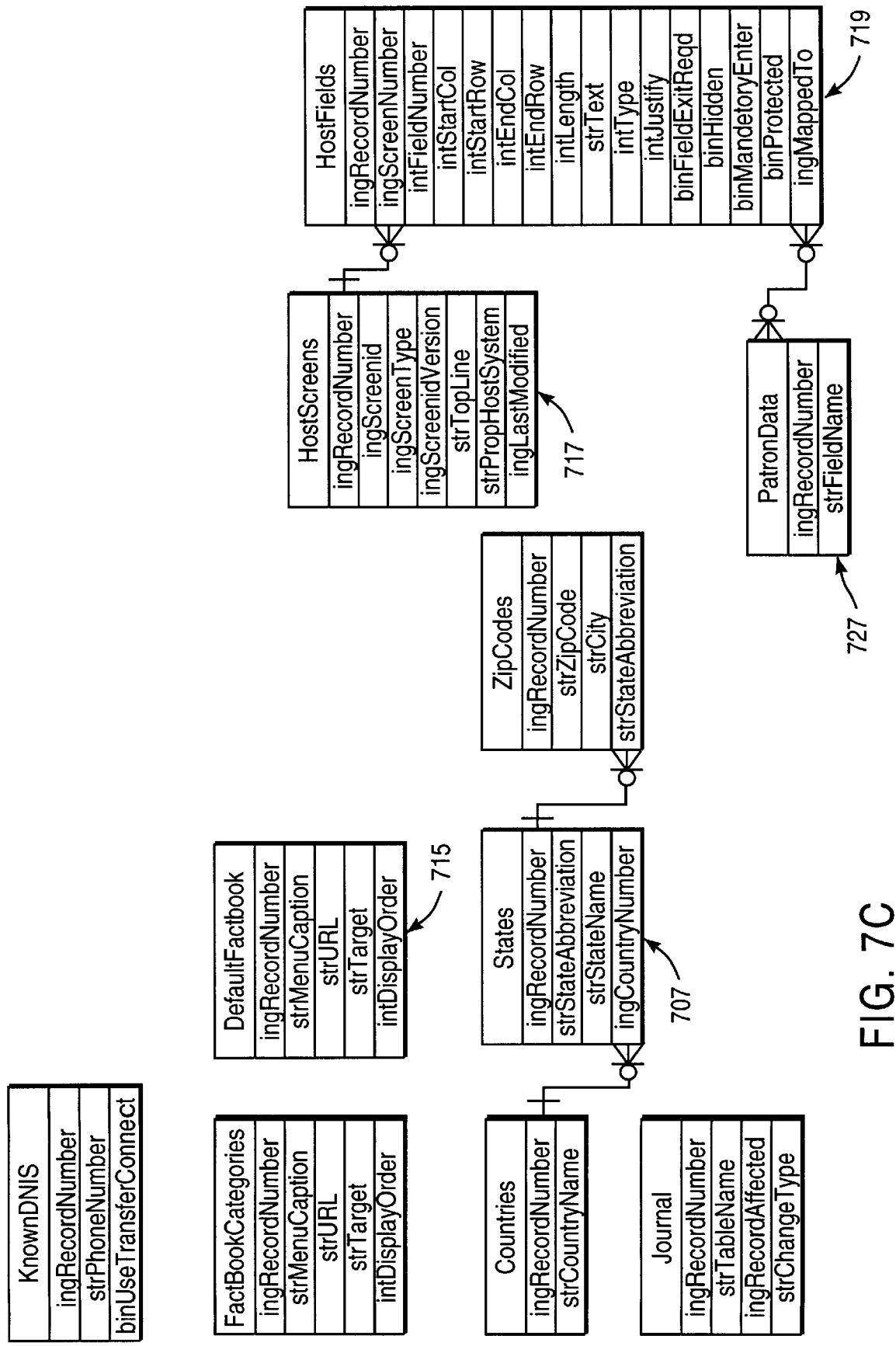

The teleservices workstation manager 201 retrieves the agent name from the operating system (the agent's network login name), displays 612 the login form 315 with the agent's user ID, and waits for agent entry of the agent's password. Upon entry of the password, the login form 315 invokes the workstation database module 305 to validate 614 the agent user ID and password against the agent identification information stored in one of the configuration databases 206. FIG. 7 shows an entity-relationship diagram for the configuration databases 206. Agent identification information is held in the Agents table 701. Selection of which configuration database 206 to use (local or server) is made at runtime based on network availability.

If the agent's password is valid, the workstation database module 305 is called 615 to get the properties associated with the agent from the configuration database 206. The teleservices workstation manager 201 then initializes the property button 405 and its menu of properties which the agent is authorized to service. The properties menu data is also used by the telephone code module 301 to define call transfer and conference destinations. Referring to FIG. 7, property data is associated with agents in XAgentsProperties table 703; host identification data is associated with the properties in XPropertiesSystemsHosts table 705, and the agent's host system logins and passwords are associated with the agent in XAgentsPropertiesSystems 707. Authorized properties may be all ticketing, all hotel, all casino, or any combination of these; there may be only one authorized property or more than one. One of the authorized properties in the properties menu becomes the current property setting for property button 405. The authorized properties are also used to define the list of permissible telephone transfer destinations for the telephone control module 301. In this manner, the agent is immediately configured to both service incoming calls, and to transfer calls to other properties.

For each property, the workstation manager 325 gets 616 property information, including connection information, and FactBook data from the configuration database 206. The teleservices workstation manager 201 uses the database module 305 to retrieve the FactBook URLs from the FactBook table 713 in the configuration database 206. This information is used upon actuation of the property button 405 to populate the FactBook pages 507 menu that is displayed upon actuation of the FactBook button 407.

The teleservices workstation manager 201 also establishes for each specified property for the agent, the appropriate terminal emulation session(s) with the specified host computer systems 230 and applications 232 for the agent, using the associations between the properties assigned to the agent, and the systems supporting these properties. These associations are defined in table XPropertiesSystemsHosts 721, and table XAgentProperties 703.

More particularly, for each authorized property of the agent, the teleservices workstation manager 201 determines if the current property for the agent includes 618 a ticketing type property; if so, then the terminal emulation module 307 establishes 620 a reservation/ticketing (R/T) terminal emulation session with the ticketing host system 230. If the current property for the agent includes 622 a hotel or other lodging type property, then the terminal emulation module 307 establishes 624 a terminal emulation session with the lodging management host system 230. If the current property for the agent includes 626 a casino type property, then the terminal emulation module 307 establishes 628 a terminal emulation session with the casino management host system 230. In each instance, the appropriate agent identification, host identification, and login information for each terminal emulation session is obtained from the configuration database 206 and passed to the terminal emulation module 307 to allow automatic sign-on of the agent.

In this way, the agent has immediate access to all host computer systems 230 for which she is assigned. In a typical instance, the agent will have terminal emulation sessions with multiple ones of the host computer system.

Upon completion, the teleservices workstation manager 201 displays the main form 325 and provides the focus to it. The agent is now able to access the other functions and operational scenarios of the teleservices workstation manager 201.

Search and Select Customer Data

The teleservices workstation manager 201 provides the ability for the agent to search for customer data based on various search criteria, and to display the customer data in the customer data display area 423. Referring to FIG. 5, actuation of the search button 413 invokes the search form 317. FIG. 8 is an example of search form 317. The agent completes any of the fields of the form, and clicks the search button 413. The search form 317 invokes patron code module 311, passing the search fields as the search parameter.

The patron code module 311 uses a generalized search procedure that takes as search parameters an account number, customer last and first name, and/or telephone number. The patron code module 311 invokes the patron server program 208, also passing in any of these input search parameters. The patron server program 208 sends a search request to the customer database system 250 via TOP END. Each such request is treated as a separate process thread; therefore, control is returned to the teleservices workstation manager 201 while the request is being processed. When the results of the search are returned by the customer database system 250 to the patron server program 208, the patron server program 208 notifies the teleservices workstation manager 201 of the number of returned patrons obtained from the request via the patron interface module 309. The teleservices workstation manager 201 takes one of three actions. Action 1 is to populate the customer data area 423 when only one customer matches the search criteria. Action 2 is to display customer data for all matching customers in the select form 319 when more than one customer matches the search criteria. FIG. 9 illustrates the select form 319 with a sample list of customers from returned search results. The agent then selects one of the customers from the list; the selected customer's data is retrieved from the customer database system 250 and then displayed in the customer data display area 423 of the main form 325. Action 3 is to display the list of properties 501 serviced by the teleservices agent.

The customer list data from the previous search is held by the select form 319. Actuation of the select button 411 at any time then shows the select form 319 from which the agent can select another set of customer data for display. When a new selection is made, the teleservices workstation manager 201 requests the customer data for the selected customer from the patron server program 208.

In addition to providing the customer data to the customer data display area 423 in the main form 325, customer data retrieved in this manner may also be "pushed" directly to the current terminal emulation session displayed in the display screen 403. Referring to FIG. 4, when the agent actuates the push button 426, screen layout information is retrieved from the configuration database 206 to identify which data fields are present on the terminal screen currently being displayed from a host computer system 230. A screen identification number is retrieved from the Terminal Emulation Module 307, and used to look up screen identification information stored in table HostScreens 717. Each of the fields available for population on a screen are defined in the table HostFields 719, including the starting and ending row and column of the field, its type, and its data entry requirements.

The patron information known to the teleservices workstation manager 201 is stored in the table PatronData 727. The patron data is then copied to the specified fields of the current screen in a terminal emulation session using EHLLAPI function calls provided in the terminal emulation module 307.

In this manner, the host computer system 230 is able to process the customer data from the customer database system 250 immediately, and the agent need not manually enter this information in the terminal emulation screen. This process further reduces the time necessary for the agent to interact with the host computer system 230, and thereby increases customer service.

In addition, storage of the data field information for each screen of the transaction support applications 232 enables improved ease of maintenance of the interfaces between the host computer systems 230 and the teleservices workstation manager 201. For example, when a new data field is added to a screen of an application 232, a new entry in the HostFields table 719 is created with the field definition. From then on, data can be automatically extracted or written to this field, without having to re-code the teleservices workstation manager 201. Similarly, changing the screen location of an existing data field merely requires updating the location data for the data field in the appropriate record in HostFields table 719. In this manner, the present invention provides for further improved integration between the host computer systems 230 and any other computer system.

Automatic Customer Data Retrieval

The teleservices workstation manager 201 provides for automatically searching for customer data in the customer database 250 when an incoming call is received at the agent's teleservices workstation 200, in order to present this customer data to the agent concurrently with the agent answering the customer call.

When the ACD 220 receives a customer call, it uses ANI (automatic number identification) or Caller ID to determine the telephone number of the customer call. This telephone number is then provided to telephone server program 202 at the teleservices workstation 200 to which the call is routed by the ACD 220 and call management system 211. The telephone interface module 303 receives the telephone number from the telephone server program 202. The teleservices workstation manager 201 then provides the telephone number to the search form 317, which automatically executes the search on the customer database system 250, as described above. When automatic customer data retrieval for an incoming call is performed, the account number, and name parameters of the search form 317 are left empty in the search form 317.

When the search results are returned by the patron server program 208, one of the three actions described above is taken. The selected customer data is then displayed in the customer data display area 423 of the main form 325.

This automatic process provides the agent with the customer data of the incoming telephone call without having to leave the teleservices workstation manager 201 application and manually search for the customer data in a separate application interface.

As with search and retrieval of customer data, the customer data from this automatic lookup of customer data may also be pushed to the current terminal emulation session in the display screen 403.

Synching Customer Data To a Customer Call

In some instances, the agent will be connected with a customer call that is not directly routed to the agent's teleservices workstation 200 as an incoming call. For example, the agent may receive the call as a transferred call, a conferenced call, or may be making the call directly to the customer. In these instances, the teleservices workstation manager 201 enables the agent to synchronize the customer data to the telephone number of the customer call on the currently connected line extension.

Referring to FIG. 5, actuation of the Sync To Call button 409 causes the currently connected telephone call to be treated as if it had been an incoming call from a customer. The telephone number is obtained by the main form 325 from the telephone server program 202, and passed to the search form 317. A search of the customer database system 250 is automatically initiated on the telephone number, as described above, with either action 1 or 2 taking place. The selected customer's customer data is displayed in the main form 325. The customer data may also be pushed to the current terminal emulation session in the display screen 403.

Selection of Terminal Emulation Sessions

The main form 325 enables selection of different ones of the terminal emulation sessions through the selection tabs 429. Selection of a tab 429 causes the terminal emulation module 307 to invoke the associated terminal emulation session for the currently selected property 405, and give it the focus. Thus, actuation of the ticket tab 429a brings the terminal emulation session for the ticketing application 232a with host computer system 230a to the front and gives it the focus. Actuation of the hotel tab 429b brings the terminal emulation session for the lodging management application 232b for the current property to the front and gives it the focus. Actuation of the casino tab 429c brings the terminal emulation session for casino management application 232c for the current property to the front and gives it the focus.

During startup, the teleservices workstation manager 201 builds an internal array of terminal emulation sessions. The terminal emulation sessions are configured using data in the tables Hosts 725, ConnectionTypes 729, HostTypes 731, and, SNAConnection 723 when needed for AS/400 sessions. The index into the terminal emulation session array is associated with the tab buttons 429 during startup by the terminal emulation module 307. When the terminal session tab 429 is actuated, the workstation manager 201 uses the array index associated with the tab 429 selected to invoke the correct terminal emulation session and give it focus.

The agent may also change the current property, and thereby the current terminal emulation sessions. Actuation of the property button 405 presents the properties menu 501 listing the properties which the teleservices workstation 200 and agent may process. The properties menu 501 was initiated at startup based on the agent's identification information. Selection from the menu changes 503 the current property setting to the selected property. The main form 325 passes the current property setting to the terminal emulation module 307 which selects a terminal emulation session or sessions for the selected property if one is active, or otherwise initiates new sessions for the selected property using the agent's identification data. Screen focus remains with the main form 325. While the terminal emulation sessions are updated, the agent still has the customer data displayed.

In this manner, the agent is able to quickly change his terminal emulation sessions with different host computer systems 250 without having to access a separate terminal emulation application.

Automatic Determination and Display of Hypermedia Data

Referring again to FIG. 5, actuation of the FactBook button 407 presents a popup menu 507 containing a list of FactBook topics for the current property. FIG. 10 illustrates a sample menu 507 of FactBook topics shown in response to actuation of the FactBook button 407. The FactBook topics may be specific for the current property as determined by the agent's selection of the property button 405; or various properties may share the same topic listings, thereby making information across properties uniform. FactBook topics and associated hypermedia data may also be descriptive of the host computer systems 230. As noted above, the property selection is initially determined at startup based on the property identification data associated with the agent's user name and identification in one of the configuration databases 206.

Each property is associated with one or more topics of hypermedia data. Each topic is associated with uniform resource locator (URL) for the specific item of data on the hypermedia server 260. In one embodiment, to determine the list of topics for a property, upon actuation of the property button 405, the workstation database module 305 identifies the topics associated with the current property selection, joining the Properties table 733 with the FactBook table 713 in the configuration database 206. In addition, all entries in the table DefaultFactBook 715 are displayed on the popup menu. These entries are separated for the other entries by a horizontal line in the popup menu. This information is stored within the FactBook popup menu 507.

Figure 18:
FIG. 18 is an illustration of the FactBook form.

The agent then selects one of the topics listed in the selection menu 507. The selection of a topic from the menu passes the URL of the selected topic to the hypermedia browser module 304 The hypermedia browser module 304 retrieves 509 the specific data from the hypermedia server 260. The data is displayed directly to the user through the FactBook form 331. FIG. 18 illustrates a sample screen of the FactBook form 331 for displaying of hypermedia data. The FactBook form 331 includes buttons 181 for navigating between pages of hypermedia data, and for returning 182 to the main form 325.

Messages

Figure 11:
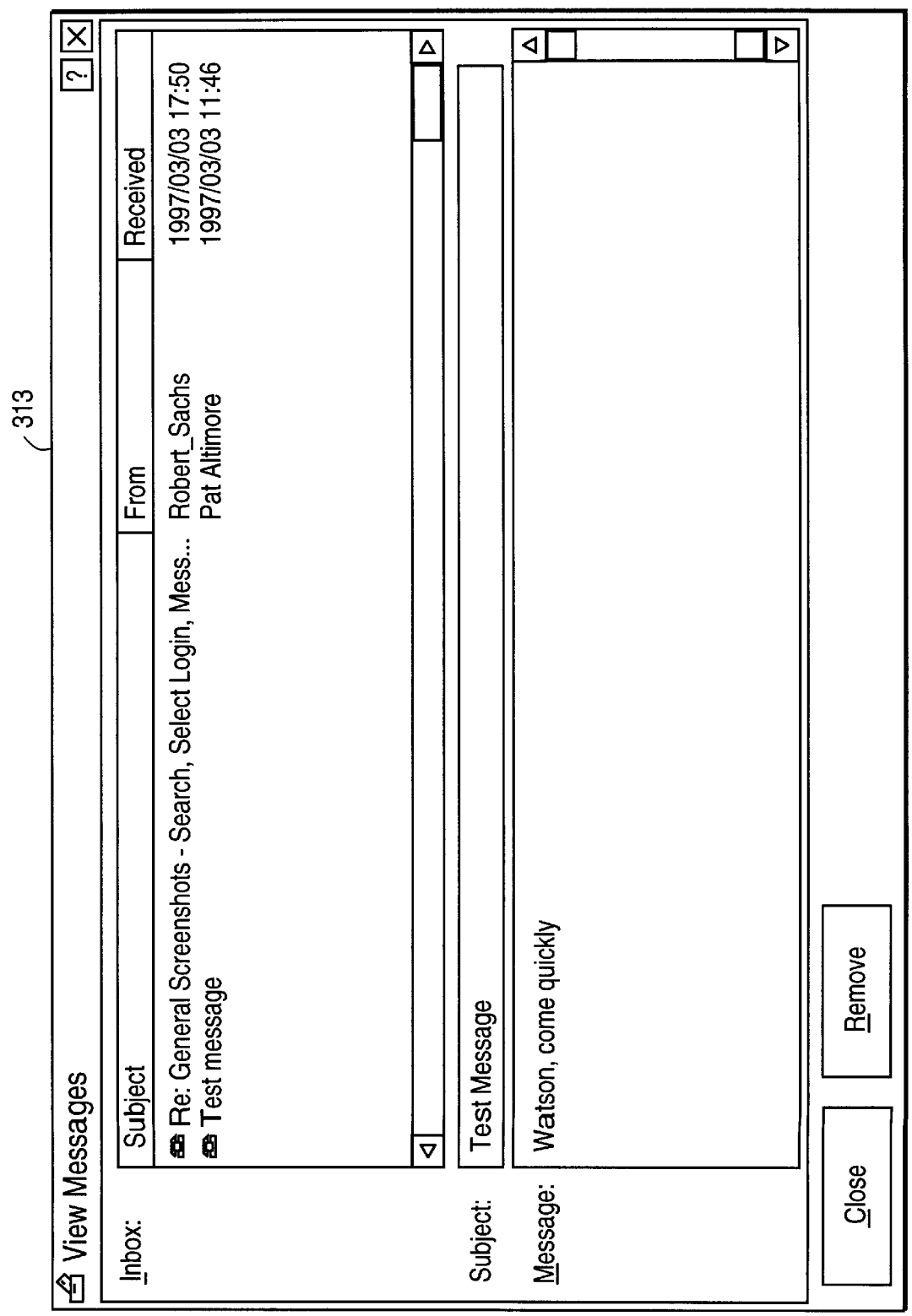
FIG. 11 is an example of the messages form.

The teleservices workstation manager 201 further provides an agent with facility for handling electronic mail. Referring to FIG. 5, actuation of the messages button 417 displays the messages form 313. FIG. 11 illustrates one example of messages form 313. The agent has the ability to read electronic messages, delete them, forward messages, and create new messages. The message form 313 interfaces with a conventional electronic messaging system using standard e-mail protocols, such as Microsoft Corp.'s Mail API, SMTP, or POP. The messages form 313 provides a routine which gets new messages and places them in a structure which is then used to update the form each time it is shown. When a message is selected in the inbox portion of the form, its subject is placed in the subject box, and its message text is placed in a message box for reading and a read flag is set. Messages are removed from the list by a remove function.

Call Purpose Logging

Referring again to FIG. 5, actuation of the call purpose button 415 invokes the call purpose form 321. The call purpose form 323 enables the agent to record in a call database 270, information regarding the purpose of each customer call, including the properties involved and the specific actions taken by the agent with regard to each property.

FIG. 12 illustrates an example call purpose form 321. The call purpose form 321 provides several call purpose list boxes 1201 which are then used to record call purpose information. Each list box 1201 is associated with a property and a host computer system 230, or other business related item. Only the list boxes for the property currently selected in the tab list 1205 are displayed. Each list box 1201 includes a list of purpose items 1203 or actions performed by the agent in handling the call. The agent selects one or more items from the appropriate list boxes 1201, each list box 1201 and item 1203 associated with a call purpose code. The recording of the call purpose codes takes place upon disconnect of the call; the telephone code module 301, upon receiving a disconnect instruction, requests the main form 325 to invoke the call purpose form 321. The agent then selects various ones of the call purpose items. The call purpose form 321 may also be displayed and data entered and changed at any time during a call, but before recording the data in the call purpose database 270.

To record the call purpose codes, the main form 325 calls the workstation database module 307 to get call purpose codes for each host system 230 available to each property assigned to an agent. Referring to FIG. 7, call purpose codes are held in table PurposeCodes 711, and the list of codes for each property is held in table XPropSystemsPurposeCodes 709. The call purpose codes list is then used to create the list boxes displaying the purpose codes for each host system 230. At least one purpose code in any of the lists must be selected before the call purpose form 321 can be dismissed after a call. If the form is not dismissed after a call within a specifiable time limit, the form is automatically dismissed and a special "timeout" purpose code is recorded along with any other selected purpose codes.

The call purpose form 321 then scans through all of the list boxes to determine the call purpose codes, and calls the workstation database module 305, which stores the call purpose codes for the call in the calls database 270. FIG. 13 illustrates the entity relationship diagram for the calls database 270. Stored information includes identification data for the call, including date, time, telephone number, agent identity for the call (Calls table 1301) along with any number of property identity, host identity, and call purpose codes for the call (Content table 1303).

Password Maintenance

Referring again to FIG. 5, actuation of the passwords button 419 invokes the password form 323 for password maintenance. FIG. 14 illustrates an example password form 323. The passwords form 323 provides an interface between the agent and the agent's password records in the configuration database 206 for purposes of host session password maintenance. For each host computer system 230, the agent has a different password. On loading of the form, the password text boxes are initialized with the passwords for the currently active system. The agent may update the password for that system. Upon exiting the form by actuating the OK button, the workstation database module 305 is called to update the password by transferring the modified password data to both the local and the server configuration databases 206. Through this form, the agent is able to rapidly configure passwords for all of the host computer systems 230.

Help

Referring again to FIG. 5, actuation of the help button 421 invokes a help form which lists various help topics. Help information is provided using conventional Microsoft Windows based help files and help manager application.

Teleservices Manager State Machine

Figure 15:
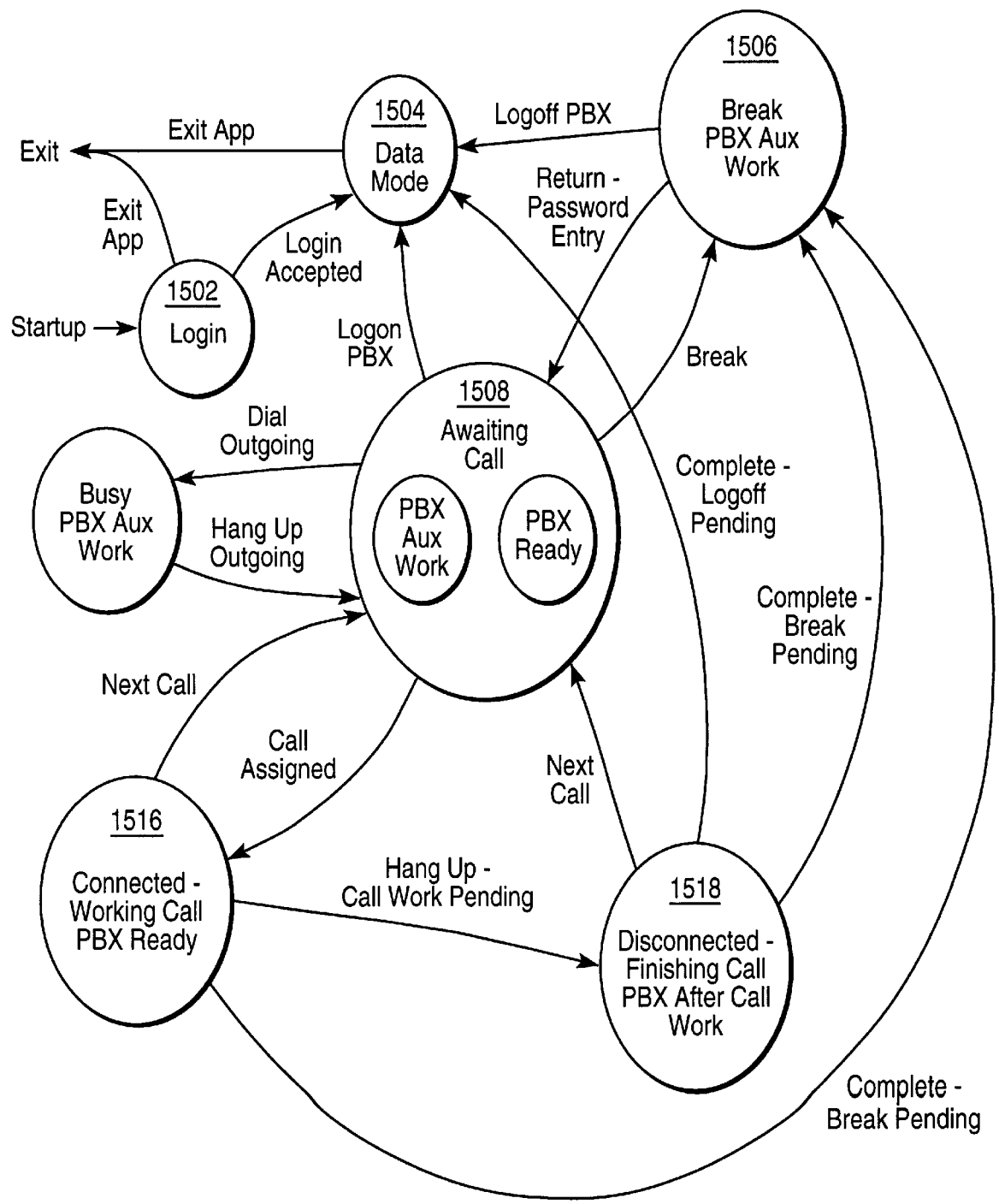
FIG. 15 is a state diagram for the teleservices workstation manager.
Figure 16A:
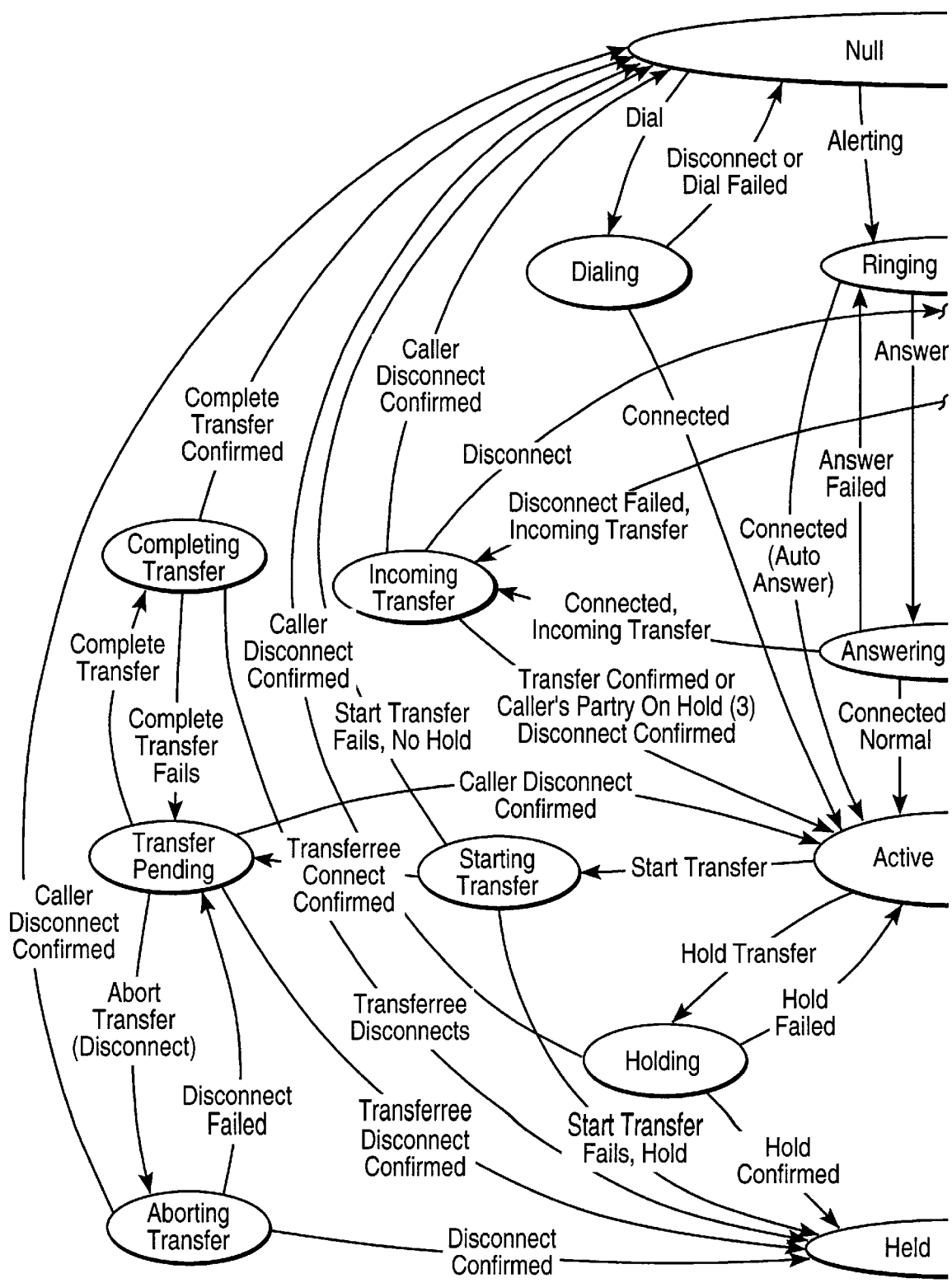
FIG. 16 is a state diagram for each telephone line extension coupled to the teleservices workstation.
Figure 16B:
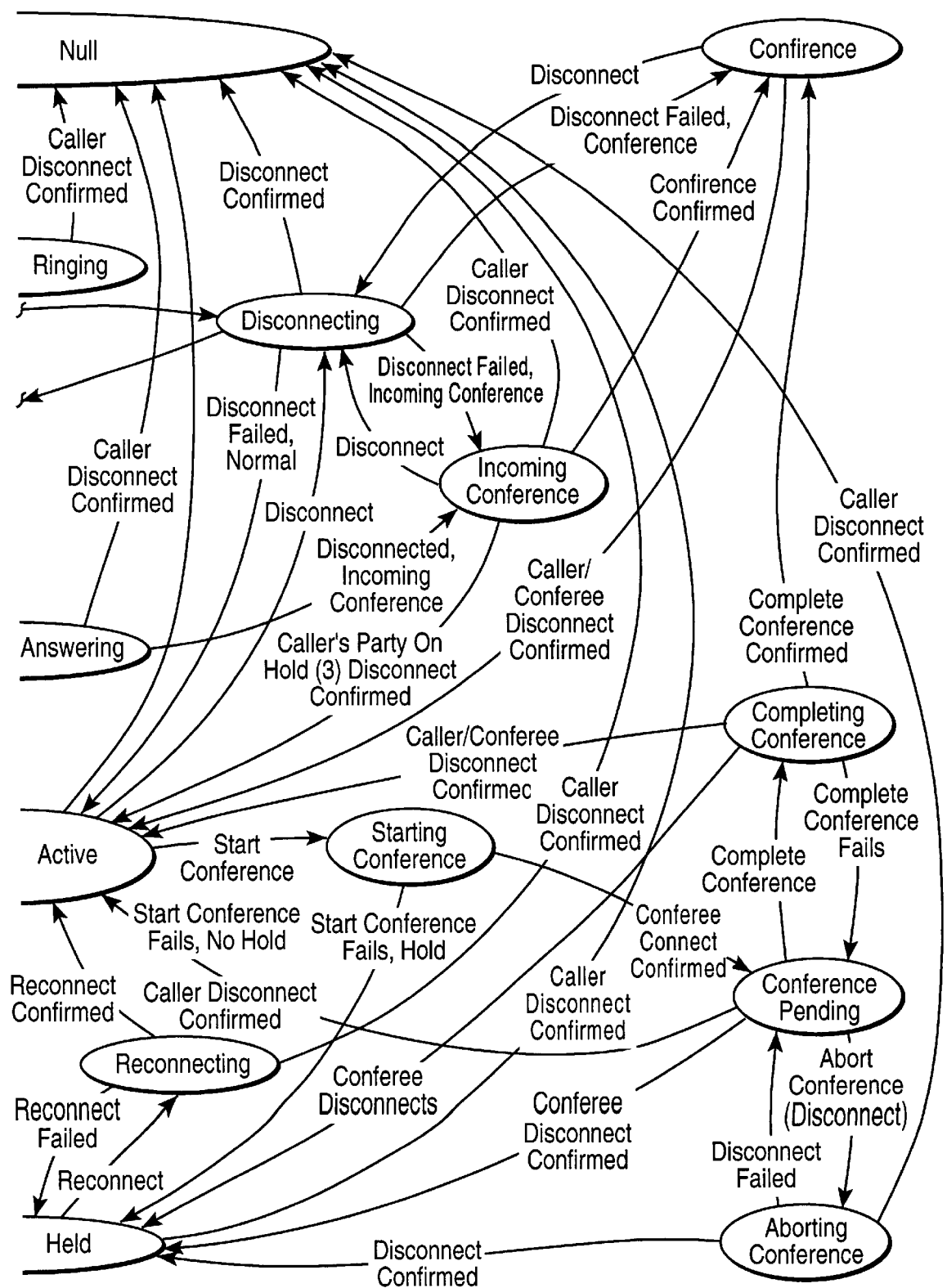

The operation of the teleservices workstation manager 201 can be modeled as a collection of loosely coupled finite state machines. The teleservices workstation 200 state corresponds roughly to a state machine within the ACD 220 with regard to the agent state, as shown in FIG. 15. A separate state machine exists for each telephone extension appearance controlled by the teleservices workstation manager 201. The state machine for each telephone extension is shown in FIG. 16. The state machine for the teleservices workstation manager 201 and the telephone extensions are essentially independent, with the only interaction between them occurring at the connection or disconnection of a telephone call, at which point the teleservices workstation manager 201 state machine may be forced to a particular state. The state machine is driven by agent interaction with the telephony control panel 427. The state machine is controlled by the state machine module 327. The individual states of the teleservices workstation manager 201 are as follows:

Login 1502—This state is entered automatically on startup. In this state, the teleservices workstation manager 201 displays the login form 315 and waits for the agent to enter his password. Login proceeds as described above with respect to FIG. 6, with the teleservices workstation manager 201 validating the agent password and initializing the various components of the application, including the property selection and terminal emulation sessions. This state transitions to the Data state 1504 on valid password entry or exits the application upon actuation of a cancel button on the login form 315 followed by selection of a Yes button on a subsequent Exit Application message box.

Data 1504—This state allows the agent access to all functions of the teleservices workstation manager 201 without the agent being logged onto the ACD for automatic call distribution ACD logon takes place from this state. This state is entered from the Login state 1502 upon successful login, and from the Awaiting Call 1508, Disconnected 1518, and Break 1506 states upon PBX logoff. This state transitions to the PBX Aux Work state 1510 upon PBX logon and application exit upon agent selection of the exit button.

Awaiting Call 1508—This state signifies that the agent is available for a customer call and is waiting on a call to be assigned by the call management system 211. The teleservices workstation manager 201 displays the main form 325 in this state, and the various operational scenarios described above are accessible from here. This state is entered from the Data state 1504 in response to the agent selecting an Available button 443, from the Break state 1506 on return of the agent and valid password entry, and from the Connected 1516 and Disconnected 1518 states upon actuation of the Available button 443 in the telephony control panel 427. This state transitions to the Connected state 1516 upon call assignment, to the Break state 1506 upon actuation of the Break button 433 in the telephony control panel 427, and to the Data state 1504 upon actuation of the Logout button 441 in the telephony control panel 427.

Break 1506—This state signifies that the currently logged in agent is not available for call processing, typically being on a break. The teleservices workstation manager 201 displays the login form 315 and awaits password entry. This state is entered from the Awaiting Call state 1508 upon actuation of the Break button 433 and from the Connected 1516 and Disconnected 1518 states upon completion of processing with break pending. This state transitions to the Awaiting Call state 1508 upon valid password entry or the Data state 1504 upon actuation of the cancel button on the login form 315 followed by selection of the Yes button on the subsequent logoff message box.

Connected 1516—This is the state in which the agent actually interacts with the customer on the telephone. It is also the state in which most of the call processing activity takes place. During this state the main form 325 is displayed, and the agent has access to the operational scenarios of the main form 325, including selection of a current property, selection of terminal emulation sessions, and access to FactBook data. This state is entered only from the Awaiting Call state 1508 upon call assignment. When the agent enters this state, the telephone number of the telephone call is used to search the customer database system 250 for the customer data which is displayed in the customer data display area 423. Also, the Available button 443 is replaced by Call Work button 445.

This state transitions to the Awaiting Call state 1508 upon completion of call processing with no other state pending (actuation of the Available button 443), the Disconnected state 1518 upon telephone disconnect with Call Work pending (actuation of the Call Work button 445), the Break state 1506 upon completion of call processing with Break pending (actuation of the Break button 433), or the Data state 1504 upon completion of call processing with Logout pending (actuation of the Logout button 441).

Disconnected 1518—This state allows the agent to complete call processing actions after disconnecting from the guest but before becoming available for a subsequent call. This state is entered from the Connected state 1516 upon disconnect with Call Work pending by actuation of the Call Work button 445. In this state, the agent can perform additional call related tasks, such as completing the reservation, or the call purpose form 323, sending a message related to the call, or other tasks. Upon completion of call processing, this state transitions to the Awaiting Call state 1508 with no other state pending (actuation of the Available button 443), the Break state with Break pending (actuation of the Break button 433), or the Data state with Logout pending (actuation of the Logout button 441).

Busy 1514—This state occurs when the agent answers a non-customer call (as indicated by the call's customer data) or decides to make an outgoing telephone call while in the Awaiting Call state 1508 (no incoming call connected). This state is necessary since the ACD 220 cannot be allowed to assign an incoming call if the connection is in use, and an explicit state change is required to avoid a deadlock condition between the ACD 220 and the teleservices workstation manager 201 because a call is assigned while the teleservices workstation manager 201 is preparing to dial an outgoing number.

The Busy state 1514 is also entered upon from the Connected state 1516 following release of the customer call to engage in Call Work. This state is used by the agent to record the call purpose for the call in the call purpose form 321.

Telephony Control

FIGS. 17a–h illustrate the various configurations of the telephony control panel 427 in conjunction with each of the above described states.

FIG. 17a illustrates the telephony control panel 427 for the Login state 1502, which displays status messages indicating the stage of the login process, including initialization of the teleservices workstation manager 201.

FIG. 17b displays the telephony control panel 427 in the Data state 1504 prior to login into the ACD 220. The Login button 435 initiates login of the agent to the ACD 220. The Break button 433 transitions to the Break state 1506.

FIG. 17c displays the telephony control panel 427 after successful login in the Data state 1504, the Login button 435 changing to a Logout button 441. The Available button 443 is used by the agent to indicate availability to receive a new customer call from the ACD 220. Actuation transitions to the Awaiting Call state 1508, and the Available button 443 is removed.

FIG. 17d displays the telephony control panel 427 in the Awaiting Call state 1508, after selection of the Available button 443, and the Busy state 1506 following initiation of a telephone call. Here, the Logout 441 and Break 433 buttons are mutually exclusive in operation. If one is actuated, the other becomes disabled. In the Awaiting Call state 1508, the Break button 433 causes transition to the Break 1506 state, and the Logout button 441 causes transition to the Data state 1504. In the Busy state 1506, the Break button 433 is disabled, and the Logout button 411 causes transition to the Data State 1504.

FIG. 17e shows the telephony control panel 427 in the Awaiting Call state 1508 when an incoming call has been routed to the teleservices workstation 200 and before being answered by the agent. Here the software "LED" 439 of the appropriate Line button 437 flashes in red, indicating an incoming call on the respective line. The customer call is automatically connected to the agent following a two second warning tone. In the case the call is from within the call center, the agent may answer the call by clicking on the appropriate Line button 437.

FIG. 17f shows the telephony control panel 427 in the Connected state 1516; the software LED 449 is set to green while the call is active. In this state, the agent handles the call, and accesses the various functions of the teleservices workstation manager 201.

FIG. 17g shows the telephony control panel 427 in the Connected state 1516 as the agent is about to execute some function on the call. Clicking on the Line button 437 for the call causes the display of the function menu 447 with the functions of holding, transferring, releasing, or conferencing the customer call. The agent then selects from a property menu 501 to designate the target destination for the call. The property menu 501 is initialized as described above.

When a call is released by the agent, the call purpose form 321 is automatically displayed for the agent to select and record the call purpose codes applicable to the call.

When a call is transferred from a source agent to a target agent, or conferenced with a target agent, the customer data at the source agent's teleservices workstation manager 201 is structured into a message and forwarded over the network to the target agent's teleservices workstation manager 201, where it is displayed in the customer data display area 423 for the target agent. In this manner, the target agent does not have to re-perform the customer search on the customer's telephone number or other data. This eliminates the need for the target agent to repeat the search that was previously done, and again improves customer service.

When the call is placed on hold, the software LED 439 is set to yellow; the call is re-connected to the agent upon actuation of the Line button 437 for the call. When a transfer is pending, the software LED 439 is set to orange. When a conference is pending, the software LED 439 is set to cyan, and blue when the conference is completed. While a call transfer or conference is pending, actuation of the line button for the call presents a menu to complete or abort the operation.

FIG. 17h shows the telephony control panel 427 in the Disconnected state 1518, following disconnection of the telephone line, and actuation of the Call Work button 445. The Available button 443 is shown, to enable the agent to return to the Awaiting Call state 1508. The Break button 433 transitions to the Break state 1506. During this state, the agent is not available to receive incoming calls from the ACD 220.

Telephone Server Program

The teleservices workstation manager 201 requires an interface into the call management system 211 in order to interact with the ACD 220 to receive and process incoming and outgoing calls. In one embodiment, where there are various call center operations that are not standardized on one call management system 211, it is desirable to separate the interface to the call management system 211 from the teleservices workstation manager 201 program and make it a stand-alone program which can be changed to interface with different call management systems 211, including proprietary in-house developments. In this manner, the teleservices workstation manager 201 remains unchanged and may be readily deployed with any variety of different call management systems 211. In this embodiment then, the interface between the teleservices workstation manager 201 and the call management system 211 is the telephone server program 202.

The telephone server program 202 provides a complete interface into the call management system 211 for directing and tracking call processing while using the teleservices workstation manager 201. In a preferred embodiment, the telephone server program 202 is a Microsoft Visual Basic 4.0 application operating as a 32-bit OLE Out-Of-Process Server executing under Microsoft Corp.'s Windows 95 operating system. The telephone server program 202 is implemented as an OLE wrapper around a dll (dynamic load and link) interface module provided by MicroAutomation Inc's Call Center/6000. In this embodiment, the telephone server program 202 is launched by and run concurrently with the teleservices workstation manager 201. When the teleservices workstation manager 201 is about to exit, it sends a message to the telephone server program 202 directing it to unload itself. The telephone server program 202 itself preferably utilizes a 32-bit OCX for actual interface to the call management system 211.

In one embodiment, the interface between the telephone server program 202 and the teleservices workstation manager 201 is based on OLE Automation. The telephone server program 202, acting as an OLE server, exposes properties and methods for communicating with generic call management system functions; these properties and methods are utilized by the teleservices workstation manager 201 acting as an OLE client. The teleservices workstation manager 201 in turn exposes and registers a class object containing one or more properties or methods for retrieval of data and statuses which the telephone server program 202 may access as a client to return appropriate responses. The telephone server program 202 translates the generic properties and methods of the teleservices workstation manager 201 to specific actions appropriate to the call management system 211 for which the particular telephone server program 202 version is designed.

Teleservices Workstation Manager Interface To the Telephone Server Program

The following paragraphs describe the interface between the teleservices workstation manager 201 and the telephone server program 202 in terms of the properties and methods exposed by the telephone server program 202 in class object CallManagement.

WorkstationID Property

This property tells this instance of the telephone server program 202 on which the workstation it is running. This value will be used to ensure accurate call routing by the call management system 211.

AgentID Property

This property tells this instance of the telephone server program 202 which agent is logged into the workstation. This value will be used for logging into ACD 220 functions in the telephone system.

AgentPassword Property

This property tells this instance of the telephone server program 202 the ACD password of the agent logged into the workstation. This value will be used for logging into ACD 220 functions in the telephone system.

ErrorString Property

This read-only property allows the teleservices workstation manager 201 to access a text string explaining the last error encountered by the telephone server program 202.

Register Method

This method is used by the teleservices workstation manager 201 to register its class PhoneInterface object reference so that the telephone server program 202 can communicate back to the teleservices workstation manager 201.

Activate Method

This method activates the telephone server program 202 to process incoming telephone events. This method will make it easy to resynchronize the telephone server program 202 with the teleservices workstation manager 201 after a CTI link or server outage.

Logon Method

This method is used by the teleservices workstation manager 201 to log the current agent into the ACD 220.

Logoff Method

This method is used by the teleservices workstation manager 201 to log the current agent out of the ACD 220.

SetAvailable Method

This method is used by the teleservices workstation manager 201 to set the ACD 220 to send calls to the teleservices workstation 200.

SetAuxWork Method

This method is used by the teleservices workstation manager 201 to set the ACD 220 to Aux Work mode for the agent.

Answer (Line) Method

This method indicates that the call management system 211 should answer the line indicated.

Disconnect (Line) Method

This method indicates that the call management system 211 should disconnect the line indicated.

Hold (Line) Method

This method indicates that the call management system 211 should place the indicated line on hold.

Reconnect (Line) Method

This method indicates that the call management system 211 should reconnect the call held on the line indicated.

Dial (Line, Number) Method

This method indicates that the call management system 211 should originate an outgoing call on the line indicated using the telephone number supplied.

StartTransfer (Line, TransferToNumber) Method

This method indicates that the call management system 211 should start a transfer of the call on the line indicated to the specified telephone number.

CompleteTransfer (Line) Method

This method indicates that the call management system 211 should complete the transfer of the call on the line indicated.

StartConference (Line, ConferenceWithNumber) Method

This method indicates that the call management system 211 should start a conference for the call on the line indicated with the specified telephone number.

CompleteConference (Line) Method

This method indicates that the call management system 211 should complete the conference of the call on the line indicated.

ExitPhone Method

This method indicates that the teleservices workstation manager 201 has been commanded to exit and that the telephone server program 202 should also exit.

Telephone Server Program Interface To Teleservices Manager

The following paragraphs describe the interface between the telephone server program 202 and the teleservices workstation manager 201 in terms of the properties and methods exposed by the teleservices workstation manager 201 in class object PhoneInterface.

EnablePhone Method

This method indicates that Telephone server program 202 functions are available to the teleservices workstation manager 201 program.

DisablePhone Method

This method indicates that Telephone server program 202 functions are not available to the teleservices workstation manager 201 program.

ConfirmAlerting (Line, ANI) Method

This method confirms that an incoming call is alerting on the indicated line.

ConfirmConnected (Line, Party) Method

This method confirms that a call has been connected on the indicated line; party parameter specifies whether the connection is with an original caller (or callee) or a third party, such as in a transfer or conference.

FailAnswer (Line) Method

This method confirms that an attempt to answer an alerting call on the indicated line has failed.

ConfirmDisconnected (Line, Party) Method

This method confirms that the party indicated on the line has been disconnected.

FailDisconnect (Line) Method

This method confirms that an attempt to disconnect the call on the indicated line has failed.

ConfirmHold (Line) Method

This method confirms that the call on the indicated line has been placed on hold.

FailHold (Line) Method

This method confirms that an attempt to place on hold the call on the indicated line has failed.

FailReconnect (Line) Method

This method confirms that an attempt to reconnect a held call on the indicated line has failed.

FailDial (Line) Method

This method confirms that an attempt to dial an outgoing call on the indicated line has failed.

ConfirmStartTransfer (Line) Method

This method verifies that the start transfer action requested on the line indicated has succeeded.

FailStartTransfer (Line ) Method

This method confirms that an attempt to start a transfer action on the indicated line has failed.

ConfirmCompleteTransfer (Line) Method

This method verifies that the complete transfer action requested on the line indicated has succeeded.

FailCompleteTransfer (Line) Method

This method confirms that an attempt to complete a transfer action on the indicated line has failed.

ConfirmStartConference (Line) Method

This method confirms that the start conference action requested on the line indicated has succeeded.

FailStartConference (Line) Method

This method confirms that an attempt to start a conference action on the indicated line has failed.

ConfirmCompleteConference (Line) Method

This method verifies that the complete conference action requested on the line indicated has succeeded.

FailCompleteConference (Line) Method

This method confirms that an attempt to complete a conference action on the indicated line has failed.

ConfirmLogon Method

This method confirms that the requested agent logon has succeeded.

RejectLogon Method

This method confirms that the requested agent logon has failed.

ConfirmLogoff Method

This method confirms that the requested agent logoff has succeeded.

RejectLogoff Method

This method confirms that the requested agent logoff has failed.

Confirm Available Method

This method confirms that the requested action making the agent available for ACD 220 calls has succeeded.

RejectAvailable Method

This method confirms that the requested action making the agent available for ACD 220 calls has failed.

ConfirmAuxWork Method

This method confirms that the requested action placing the agent into aux work mode has succeeded.

RejectAuxWork Method

This method confirms that the requested action placing the agent into aux work mode has failed.

Startup Handshake Between Teleservices Manager and the Telephone Server Program

The following steps are implemented by the teleservices workstation manager 201 and the telephone server program 202 in order to establish the OLE interface between the two.

The teleservices workstation manager 201 starts the telephone server program 202 by requesting that an instance of the telephone server program's CallManagement class be created. Since the telephone server program 202 will have been compiled as an Out-Of-Process OLE Server, it runs in its own process space separately from the teleservices workstation manager 201. The teleservices workstation manager 201 uses this object reference in accessing all properties and methods provided by the telephone server program 202.

The teleservices workstation manager 201 creates an instance of its PhoneInterface class. The teleservices workstation manager 201 executes the Register method of the telephone server program's CallManagement class with a parameter of the PhoneInterface class object. The telephone server program 202 then uses this class object reference when accessing properties and methods provided by the teleservices workstation manager 201 program.

Patron Server Program

The teleservices workstation manager 201 requires an interface into customer database system 250 in order to handle all of the necessary data retrieval and update requests. This interface is provided by the patron server program 208. In one embodiment, the patron server program 208 is implemented as a 32-bit OLE out-of-process server, using Microsoft Visual C++ 4.2 executing under the Windows 95 operating system. The patron server program 208 is preferably launched by and run concurrently with the teleservices workstation manager 201. When the teleservices workstation manager 201 is about to exit, it sends a message to the patron server program 208 directing it to unload itself.

The interface between the patron server program 208 and the teleservices workstation manager 201 may be based on OLE Automation. The patron server program 208, acting as an OLE server, exposes properties and methods for utilization by the teleservices workstation manager 201 acting as an OLE client. The methods are in essence procedures which perform the task of calling the appropriate function which in turn actually builds and sends a message to the customer database system 250 via TOP END. The teleservices workstation manager 201 in turn exposes and registers a class object containing one or more properties or methods for retrieval of data and statuses which the patron server program 208 accesses as a client to return appropriate responses.

Patron Server Program Interface to Teleservices Workstation Manager

The following paragraphs describe the interface between the patron server program 208 and the teleservices workstation manager 201 in terms of the properties and methods exposed by the patron server program 208 in class object clsPatronServer.

Error Property

Holds the text message for any error condition detected by the patron server program 208.

Initialized Property

Indicates the patron server program 208 has initialized successfully.

Notify Property

Notifies the teleservices workstation manager 201 that the requested search has completed and indicates the number of patrons returned.

Register Method

Used by the teleservices workstation manager 201 to register its class clsPatronInterface object reference so that the patron server program 208 can communicate back to the teleservices workstation manager 201.

FindGuests Method

Builds a message based on the fields given by the client. The message is sent to the customer database system 250 via TOP END. When complete, the Notify property is set.

GetFindGuestsResults Method

Passes results of FindGuests back to teleservices workstation manager 201.

ExitServer Method

Indicates a request to exit. The patron server program 208 prepares to exit.

Login Method

Used by the teleservices workstation manager 201 to pass TOP END an authentication certificate for the agent user ID and password to the patron server program 208 and request TOP END sign-on.

EnablePatronSearch Method

Used by the patron server program 208 to enable the search option within the teleservices workstation manager 201. This method is invoked after successful TOP END sign-on.

DisablePatronSearch Method

Used by patron server program to disable the search option within the teleservices workstation manager 201. This is invoked if an unrecoverable error occurs.

Constructor: clsPatronServer

When the teleservices workstation manager 201 initially requests the patron server program 208, the patron server program 208 begins execution invisible to the user. The clsPatronServer constructor is invoked automatically and starts a worker thread. A request is made to the worker thread to initialize TOP END, and interface gateways.

Destructor: ~clsPatronServer

When the reference to clsPatronServer in the teleservices workstation manager 201 falls out of scope, the clsPatronServer destructor is automatically invoked and frees all allocated memory.

Teleservices Manager Interface to the Patron Server Program

The following describes the interface between the teleservices workstation manager 201 and the patron server program 208 in terms of the methods exposed by the telephone server program 202 in class object clsPatronInterface (patron interface module 309).

SetNotify (Let Notify)

Sets the results variable in the teleservices workstation manager 201. From the patron server program 208 perspective this appears as a method (SetNotify). However, to the teleservices workstation manager 201 it appears as a property (Let Notify).

DisablePatronSearch

Disables the search button 413 and select button 411 in the main form 325.

EnablePatronSearch

Enables the search button 413 and select button 411 in the main form 325.

In order to provide asynchronous processing within the patron server program 208, all communication and processing of customer data to the customer database system 250 is handled by a separate worker thread. The worker thread shares the same process ID, memory space, and global variables as the initial thread. To provide this functionality, the worker thread has access to the OLE interface pointer of the teleservices workstation manager 201. However, OLE interface pointers are not thread-safe and cannot be used between threads. Therefore, the OLE interface is marshaled into a stream. Streams are thread-safe and allow OLE methods and properties to be invoked and set from another thread.

In summary, the present invention provides a teleservices system 100, teleservices workstation 200, and a teleservices manager program 201 for agent use in a teleservices call center. The teleservices system 100 provides an environment including multiple host computer systems 230 requiring terminal emulation sessions, a customer database system, Internet/intranet systems storing hypermedia data descriptive of the computers and various properties, and a call management system for automatic call distribution. The teleservices workstation manager 201 operates on the teleservices workstation 200, and provides for integrated interaction with these various systems, including automatic configuration of each agent's environment from configuration data stored in a configuration database 206. Automatic configuration includes automatic selection and initiation of host computer systems 230 and properties for the agent to access through terminal emulation sessions, automatic selection of hypermedia data associated with such properties or host computer systems 230, and automatic searching of customer data in the customer database system 250 in response to routing of an incoming telephone call. In this fashion the invention enables the agent to access and manipulate multiple, different systems, through a single application. The teleservices workstation manager 201 provides for complete telephony control of the call management system through a small footprint, on-screen telephony control panel 427. All interactions by the agent to the system are managed through an integrated user interface of the teleservices workstation manager 201.

We claim:

1. A teleservices computer system for a teleservice center having an automatic call distributor (ACD) that receives customer calls, the teleservices computer system providing an integrated presentation of information from multiple diverse computer systems, comprising:

a first configuration database containing configuration information for each of a plurality of users, the configuration information specifying for each user, user identification information, and host identification information identifying at least one of a plurality of host computer systems to be accessed by the user through a terminal emulation session; and a teleservices application, comprising:

a telephony control module that interfaces the teleservices application to the ACD, to receive from the ACD a telephone number of a customer call received at the ACD;

a database interface to a customer database of customer data, that automatically provides the telephone number of the customer call received from the telephony control module to the customer database to retrieve customer data associated with the telephone number;

a browser interface to a hypermedia server containing hypermedia data associated with individual ones of a plurality of host computer systems, that provides the host identification information of the at least one host computer system to be accessed by the user to the server and that receives the hypermedia data associated with the identified host computer systems;

a terminal emulation module providing a plurality of user selectable terminal emulation sessions to the host computer systems, that receives the identification information of each host computer system to be accessed by the user, and that automatically establishes a terminal emulation session with each identified host computer system by automatically logging in the user with the user identification information in the configuration database; and wherein the system provides services for a plurality of properties and a customer call is serviced with respect to at least one property, and wherein the teleservices application interfaces with a call purpose database to record a purpose for the customer call, each purpose identifying a property associated with the customer call and at least one action taken by the user with respect to the customer call and the property.

2. The system of claim 1, further comprising:

an integrated user interface that displays through a plurality of user selectable display screens the hypermedia data received from the hypermedia server, at least one of the plurality of terminal emulation sessions, and the telephone number and associated customer data for the customer call.

3. The system of claim 1, wherein the teleservices application provides selected customer data retrieved from the customer database to at least one of the host computer systems for which there is a terminal emulation system.

4. The teleservices system of claim 1, wherein the first configuration database is located on a centralized computer system, the system further comprising:

a second configuration database, located on a same computer workstation as the teleservices application, and providing a replicated copy of the first configuration database, the teleservices application accessing the first or second configuration databases depending on availability of the databases on a network.

5. The teleservices application of claim 1, further comprising:

a telephony control panel that provides telephony control over at least two telephone line extensions between the ACD and the teleservices application.

6. The system of claim 1, wherein the configuration database further comprises:

for data entry fields on selected screen displays of applications of the plurality of host computer systems, information defining screen locations and data entry formats for the data fields, to enable the terminal emulation module to transfer data between the data entry fields of a screen display and either data fields of another screen display or data fields of the customer database.

7. A teleservices computer system for a teleservice center having an automatic call distributor (ACD) that receives customer calls, the teleservices computer system providing an integrated presentation of information from multiple diverse computer systems, comprising:

a first configuration database containing configuration information for each of a plurality of users, the configuration information specifying for each user, user identification information, and host identification information identifying at least one of a plurality of host computer systems to be accessed by the user through a terminal emulation session; and a teleservices application, comprising:

a telephony control module that interfaces the teleservices application to the ACD, to receive from the ACD a telephone number of a customer call received at the ACD;

a database interface to a customer database of customer data, that automatically provides the telephone number of the customer call received from the telephony control module to the customer database to retrieve customer data associated with the telephone number;

a browser interface to a hypermedia server containing hypermedia data associated with individual ones of a plurality of host computer systems, that provides the host identification information of the at least one host computer system to be accessed by the user to the server and that receives the hypermedia data associated with the identified host computer systems;

a terminal emulation module providing a plurality of user selectable terminal emulation sessions to the host computer systems, that receives the identification information of each host computer system to be accessed by the user, and that automatically establishes a terminal emulation session with each identified host computer system by automatically logging in the user with the user identification information in the configuration database;

a search function that automatically receives a telephone number of a customer call transferred or conferenced to a user and provides the telephone number to the database interface for retrieving from the customer database system customer data corresponding to the telephone number; and a select form that automatically displays a list of customers corresponding to the telephone number in response to the customer database system retrieving the list of customers.

8. The system of claim 7, further comprising:

an integrated user interface that displays through a plurality of user selectable display screens the hypermedia data received from the hypermedia server, at least one of the plurality of terminal emulation sessions, and the telephone number and associated customer data for the customer call.

9. The system of claim 7, wherein the teleservices application provides selected customer data retrieved from the customer database to at least one of the host computer systems for which there is a terminal emulation system.

10. The teleservices system of claim 7, wherein the first configuration database is located on a centralized computer system, the system further comprising:

a second configuration database, located on a same computer workstation as the teleservices application, and providing a replicated copy of the first configuration database, the teleservices application accessing the first or second configuration databases depending on availability of the databases on a network.

11. The teleservices application of claim 7, further comprising:

a telephony control panel that provides telephony control over at least two telephone line extensions between the ACD and the teleservices application.

12. The system of claim 7, wherein the configuration database further comprises:

for data entry fields on selected screen displays of applications of the plurality of host computer systems, information defining screen locations and data entry formats for the data fields, to enable the terminal emulation module to transfer data between the data entry fields of a screen display and either data fields of another screen display or data fields of the customer database.

13. A teleservices computer system for a teleservice center having an automatic call distributor (ACD) that receives customer calls, the teleservices computer system providing an integrated presentation of information from multiple diverse computer systems, comprising:

a first configuration database containing configuration information for each of a plurality of users, the configuration information specifying for each user, user identification information, and host identification information identifying at least one of a plurality of host computer systems to be accessed by the user through a terminal emulation session, the first configuration database including for each user, property identification information identifying at least one property that the user is authorized to service, each property associated with at least one host computer system; and a teleservices application, comprising:

a telephony control module that interfaces the teleservices application to the ACD, to receive from the ACD a telephone number of a customer call received at the ACD;

a database interface to a customer database of customer data, that automatically provides the telephone number of the customer call received from the telephony control module to the customer database to retrieve customer data associated with the telephone number;

a browser interface to a hypermedia server containing hypermedia data associated with individual ones of a plurality of host computer systems, that provides the host identification information of the at least one host computer system to be accessed by the user to the server and that receives the hypermedia data associated with the identified host computer systems; and a terminal emulation module providing a plurality of user selectable terminal emulation sessions to the host computer systems, that receives the identification information of each host computer system to be accessed by the user, and that automatically establishes a terminal emulation session with each identified host computer system by automatically logging in the user with the user identification information in the configuration database, wherein the teleservices application dynamically selects or establishes terminal emulation sessions with the host computer systems associated with a user selected one of the properties.

14. The system of claim 13, further comprising:

an integrated user interface that displays through a plurality of user selectable display screens the hypermedia data received from the hypermedia server, at least one of the plurality of terminal emulation sessions, and the telephone number and associated customer data for the customer call.

15. The system of claim 13, wherein the teleservices application provides selected customer data retrieved from the customer database to at least one of the host computer systems for which there is a terminal emulation system.

16. The teleservices system of claim 13, wherein the first configuration database is located on a centralized computer system, the system further comprising:
   a second configuration database, located on a same computer workstation as the teleservices application, and providing a replicated copy of the first configuration database, the teleservices application accessing the first or second configuration databases depending on availability of the databases on a network.

17. The teleservices application of claim 13, further comprising:
   a telephony control panel that provides telephony control over at least two telephone line extensions between the ACD and the teleservices application.

18. The system of claim 13, wherein the configuration database further comprises:
   for data entry fields on selected screen displays of applications of the plurality of host computer systems, information defining screen locations and data entry formats for the data fields, to enable the terminal emulation module to transfer data between the data entry fields of a screen display and either data fields of another screen display or data fields of the customer database.

19. A teleservices manager application, in a teleservice center having an automatic call distributor (ACD) that receives customer calls, comprising:
   a module that automatically establishes a plurality of terminal emulation sessions with a plurality of host computer systems that a user is authorized to access;
   a module that receives a telephone number of an incoming customer call, and provides the telephone number to a customer database system to retrieve customer data of at least customer having the telephone number;
   a module that selectively displays hypermedia data associated with one of a plurality of properties that the user is authorized to service; and
   a user interface that displays the customer data of the customer having the telephone number concurrently with at least one of the terminal emulation sessions.

20. A teleservices computer system for a teleservice center having an automatic call distributor (ACD) that receives customer calls, the teleservices computer system providing an integrated presentation of information from multiple diverse computer systems, comprising:
   a configuration database containing configuration information for each of a plurality of users, the configuration information specifying for each user, user identification information, host identification information identifying at least one of a plurality of host computer systems to be accessed by the user through a terminal emulation session, and property identification information for at least one of a plurality of properties that the user is authorized to service; and
   a teleservices application, comprising:
      a telephony control module that interfaces the teleservices application to the ACD, to receive from the ACD a telephone number of a customer call received at the ACD;
      a database interface to a customer database of customer data, that automatically provides the telephone number of the customer call received from the telephony control module to the customer database to retrieve customer data associated with the telephone number;
      a browser interface to a hypermedia server containing hypermedia data associated with individual ones of the plurality of properties, that provides location data for a property selected by the user to the hypermedia server and that receives and displays the hypermedia data associated with the location data;
      an interface to the configuration database for retrieving the property information and location data for the hypermedia data associated with the selected property; and
      a terminal emulation module providing a plurality of user selectable terminal emulation sessions to the host computer systems, that receives the identification information of each host computer system to be accessed by the user, and that automatically establishes a terminal emulation session with each identified host computer system by automatically logging in the user with the user identification information in the configuration database.

21. A computer implemented method of providing concurrent interactions in a teleservices system, comprising:
   establishing for a user a plurality of terminal emulation sessions with a plurality of host computer systems, according to stored associations between user identification information and host computer system identification information, and displaying at least one of the terminal emulation sessions to the user;
   receiving a telephone number of a customer call, and providing the telephone number to a customer database system to retrieve customer data of at least one customer associated with the telephone number, and displaying the customer data of at least one customer concurrently with the displayed terminal emulation session;
   storing for each of a plurality of users, at least one property for which the user is authorized to provide services;
   receiving a user selection of one of the properties; and
   displaying a hypermedia document associated with the user selected property.

22. The method of claim 21, further comprising:
   in response to the user selected property, displaying a terminal emulation session of a host computer system associated with the selected property.

23. The method of claim 21, further comprising:
   receiving a transferred customer call from another user;
   providing the telephone number of the transferred customer call to the customer database system to retrieve customer data of at least one customer corresponding to the telephone number of the transferred customer call; and
   displaying customer data of at least one customer concurrently with a displayed terminal emulation session.

24. The method of claim 23, further comprising:
   in response to the user selected property, displaying a terminal emulation session of a host computer system associated with the selected property.

25. The method of claim 21, further comprising:
   providing the displayed customer data to a host computer system associated with the currently displayed terminal emulation session.

26. A computer implemented method of providing concurrent interactions in a teleservices system, comprising:
   establishing for a user a plurality of terminal emulation sessions with a plurality of host computer systems, according to stored associations between user identification information and host computer system identification information, and displaying at least one of the terminal emulation sessions to the user;

receiving a telephone number of a customer call, and providing the telephone number to a customer database system to retrieve customer data of at least one customer associated with the telephone number, and displaying the customer data of at least one customer concurrently with the displayed terminal emulation session;

disconnecting the user from the customer call;

displaying a call purpose form for recording for the customer call at least one property associated with the customer call and at least one action taken by the user in response to the customer call; and storing the recorded property and action in a call purpose database.

27. A computer implemented method of providing concurrent interactions in a teleservices system having an automatic call distributor (ACD) that receives customer calls, the method comprising:

automatically establishing a plurality of terminal emulation sessions with a plurality of host computer systems that a user is authorized to access;

receiving a telephone number of an incoming customer call, and providing the telephone number of the telephone call to a customer database system to retrieve customer data of at least customer having the telephone number;

selectively displaying hypermedia data associated with one of a plurality of properties that the user is authorized to service; and displaying the customer data of the customer having the telephone number concurrently with at least one of the terminal emulation sessions.

28. The method of claim 27, further comprising:

receiving a user selection of a property, and in response to the selected property, displaying a terminal emulation session of a host computer system associated with the selected property.

29. The method of claim 27, further comprising:

receiving a transferred customer call from another user;

providing the telephone number of the transferred customer call to the customer database system to retrieve customer data of at least one customer corresponding to the telephone number of the transferred customer call; and displaying customer data of at least one customer concurrently with a displayed terminal emulation session.

30. The method of claim 27, further comprising:

providing the displayed customer data to a host computer system associated with the currently displayed terminal emulation session.

31. The method of claim 27, further comprising:

disconnecting the user from the customer call;

displaying a call purpose form for recording for the customer call at least at least one property associated with the customer call and at least one action taken by the user in response to the customer call; and storing the recorded property and action in a call purpose database.

32. A method of providing an integrated presentation of information from multiple diverse computer systems, comprising:

storing configuration information for each of a plurality of users, the configuration information specifying for each user:

user identification information, host identification information identifying at least one of a plurality of host computer systems to be accessed by the user through a terminal emulation session, and property identification information for at least one of a plurality of properties that the user is authorized to service;

receiving a telephone number of a received customer call;

providing the telephone number of the received customer call to a customer database to retrieve customer data associated with the telephone number;

storing hypermedia data associated with location data of individual ones of the plurality of properties;

receiving a user selection of a property the user is authorized to access;

retrieving and displaying hypermedia data associated with location data for the user selected property;

providing a plurality of user selectable terminal emulation sessions to the host computer systems;

receiving the identification information of at least one of the host computer systems to be accessed by the user, and automatically establishing a terminal emulation session with each identified host computer system by automatically logging in the user with the user identification information in the configuration information.

33. A computer program product for providing concurrent interactions in a teleservices system having an automatic call distributor (ACD) that receives customer calls, the method comprising:

program code means for automatically establishing a plurality of terminal emulation sessions with a plurality of host computer systems that a user is authorized to access;

program code means for receiving a telephone number of an incoming customer call, and providing the telephone number of the telephone call to a customer database system to retrieve customer data of at least customer having the telephone number;

program code means for selectively displaying hypermedia data associated with one of a plurality of properties that the user is authorized to service; and program code means for displaying the customer data of the customer having the telephone number concurrently with at least one of the terminal emulation sessions.

* * * * *